(12) United States Patent
Lee et al.

(10) Patent No.: US 10,635,349 B2
(45) Date of Patent: Apr. 28, 2020

(54) STORAGE DEVICE PREVIOUSLY MANAGING PHYSICAL ADDRESS TO BE ALLOCATED FOR WRITE DATA

(71) Applicant: SAMSUNG ELECTRONICS CO., LTD., Suwon-si, Gyeonggi-do (KR)

(72) Inventors: Younggeun Lee, Seoul (KR); Jinwoo Kim, Seoul (KR); Youngsik Kim, Suwon-si (KR); Hwan-Chung Kim, Namson-si (KR); Jeonghoon Cho, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 143 days.

(21) Appl. No.: 15/860,498

(22) Filed: Jan. 2, 2018

(65) Prior Publication Data
US 2019/0004736 A1  Jan. 3, 2019

(30) Foreign Application Priority Data
Jul. 3, 2017  (KR) .......................... 10-2017-0084233

(51) Int. Cl.
*G06F 12/00*  (2006.01)
*G06F 3/06*   (2006.01)
*G06F 12/02*  (2006.01)

(52) U.S. Cl.
CPC .......... *G06F 3/0659* (2013.01); *G06F 3/0604* (2013.01); *G06F 3/0631* (2013.01); *G06F 3/0679* (2013.01); *G06F 12/02* (2013.01)

(58) Field of Classification Search
None
See application file for complete search history.

(56) References Cited

U.S. PATENT DOCUMENTS

| | | | |
|---|---|---|---|
| 9,026,722 B2 | 5/2015 | Kamphenkel et al. | |
| 2011/0239009 A1* | 9/2011 | Noda | G06F 13/385 713/300 |
| 2013/0198437 A1* | 8/2013 | Omizo | G06F 12/0246 711/103 |
| 2016/0283116 A1 | 9/2016 | Ramalingam | |
| 2016/0283124 A1 | 9/2016 | Hashimoto et al. | |
| 2016/0283125 A1 | 9/2016 | Hashimoto et al. | |

(Continued)

FOREIGN PATENT DOCUMENTS

| KR | 10-2016-0144574 A | 12/2016 |
|---|---|---|
| KR | 10-2017-0005285 A | 1/2017 |
| KR | 10-2017-0094815 A | 8/2017 |

*Primary Examiner* — Daniel D Tsui
(74) *Attorney, Agent, or Firm* — Volentine, Whitt & Francos, PLLC

(57) ABSTRACT

A storage device includes nonvolatile memories and a controller. The controller previously manages a correspondence relationship between physical addresses indicating the memory regions and stream identifiers, before first write data is received by the controller. The controller controls the nonvolatile memories such that the first write data is stored in a first memory region of a physical address which is managed corresponding to a first stream identifier of the first write data in the correspondence relationship. The first write data is transferred to the nonvolatile memories based on the correspondence relationship, regardless of whether second write data having a second stream identifier is received by the controller.

19 Claims, 18 Drawing Sheets

(56) References Cited

U.S. PATENT DOCUMENTS

2016/0291872 A1* 10/2016 Hashimoto ............. G06F 3/064
2016/0306552 A1 10/2016 Liu et al.
2016/0357462 A1 12/2016 Nam et al.
2016/0358657 A1 12/2016 Kim et al.
2016/0371031 A1 12/2016 Kang
2017/0017411 A1 1/2017 Choi et al.
2017/0235522 A1 8/2017 Kim et al.

* cited by examiner

STORAGE DEVICE PREVIOUSLY MANAGING PHYSICAL ADDRESS TO BE ALLOCATED FOR WRITE DATA

CROSS-REFERENCE TO RELATED APPLICATIONS

The present application claims priority under 35 U.S.C. § 119 to Korean Patent Application No. 10-2017-0084233 filed on Jul. 3, 2017, in Korean Intellectual Property Office, the entire contents of which are incorporated herein by reference.

TECHNICAL FIELD

The present disclosure relates to an electronic device, and more particularly, relates to operations and configurations of a storage device that stores and outputs data.

DISCUSSION OF THE RELATED ART

In recent years, various types of electronic devices are being used. An electronic device performs its own functions according to operations of electronic circuits included therein. A storage device is an example of the electronic devices. The storage device includes a memory device for storing data. The memory device stores or outputs data, and thus the storage device provides a user with a storage service.

Meanwhile, as storage devices are widely used by many people and an amount of data gradually increases, demands for a high-performance and high-reliability storage device have increased. In addition, demands for a high-efficiency storage device, which provides sufficient services while using a small amount of resources in the storage device, have also increased.

For example, the storage device may include various electronic circuits for managing data flow. The electronic circuits of the storage device may process data by using resources of the storage device, or may store information required for data processing. When an amount of data to be processed increases, an amount of resources (e.g., computation power, buffer capacity, and/or the like) required for the storage device also increases. However, a large amount of resources may degrade efficiency of the storage device, and may increase cost of manufacturing the storage device.

SUMMARY

Example embodiments of the present disclosure may provide configurations and operations of a storage device which is capable of managing data flow even with a small amount of resources. In the example embodiments of the present disclosure, the storage device may manage a physical address to be allocated for write data, previously before the write data is received from a host. In some example embodiments, the storage device may be implemented with a centralized architecture, or may be implemented with a hardware-automated architecture.

In some example embodiments, a storage device may include nonvolatile memories and a controller. The nonvolatile memories may include memory regions. The controller may communicate with the nonvolatile memories through a plurality of channels. The controller may previously manage a correspondence relationship between physical addresses indicating the memory regions and stream identifiers, before first write data is received by the controller. The controller may control the nonvolatile memories such that the first write data is stored in a first memory region of a physical address which is managed corresponding to a first stream identifier of the first write data in the correspondence relationship. The first write data may be transferred to the nonvolatile memories based on the correspondence relationship, regardless of whether second write data having a second stream identifier is received by the controller.

In some example embodiments, a storage device may include nonvolatile memories, a buffer memory, and a controller. The nonvolatile memories may include memory regions. The buffer memory may buffer first write data and second write data which are to be stored in the nonvolatile memories. The controller may communicate with the nonvolatile memories and the buffer memory such that the first write data and the second write data are stored in the nonvolatile memories. The first write data having a first characteristic may be stored in a first memory region of the nonvolatile memories, and the second write data having a second characteristic may be stored in a second memory region of the nonvolatile memories. The first write data buffered in the buffer memory may be transferred to the nonvolatile memories, regardless of whether the second write data is buffered in the buffer memory.

In some example embodiments, a storage device may include a nonvolatile memory and a controller. The nonvolatile memory may include memory regions. The controller may control the nonvolatile memory such that first write data is stored in a memory region which is previously determined to store the first write data before the first write data is received. The first write data may be transferred to the nonvolatile memory, regardless of whether second write data is received.

In some example embodiments, a storage device may include nonvolatile memories and a controller. The nonvolatile memories may include memory regions. The controller may include a job manager circuit and a processor. The job manager circuit may manage write operations such that first write data having a first stream identifier is stored in a first memory region of the nonvolatile memories and second write data having a second stream identifier is stored in a second memory region of the nonvolatile memories. The processor may process a management operation such that an error or exception associated with the write operations is resolved. The job manager circuit may manage the write operations without intervention of the processor. The first write data received by the controller may be transferred to the nonvolatile memories, regardless of whether the second write data is received by the controller.

According to example embodiments of the present disclosure, write data may be stored in a memory region of a physical address which is previously allocated before the write data is received from a host. Accordingly, the storage device may manage the write data in a small capacity of a buffer. The storage device may be implemented including the small capacity of the buffer, and thus efficiency of managing the storage device may be improved and the cost of manufacturing the storage device may decrease.

In an example embodiment, a storage device includes nonvolatile memories and a memory controller. The memory controller: (1) generates mutually-exclusive associations between physical addresses of the nonvolatile memories and stream identifiers, (2) receives, from a host device, a first command to write data associated with a first stream identifier among the stream identifiers, and (3) communicates to a first nonvolatile memory, among the nonvolatile memories, a second command comprising a first physical address, among the physical addresses, associated with the first stream identifier and the data, received from the host device, to be stored at the first physical address.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Below, some example embodiments will be described in detail and clearly with reference to accompanied drawings such that those skilled in the art can easily implement the present disclosure.

I. Example Electronic System Associated with Present Disclosure

Figure 1:
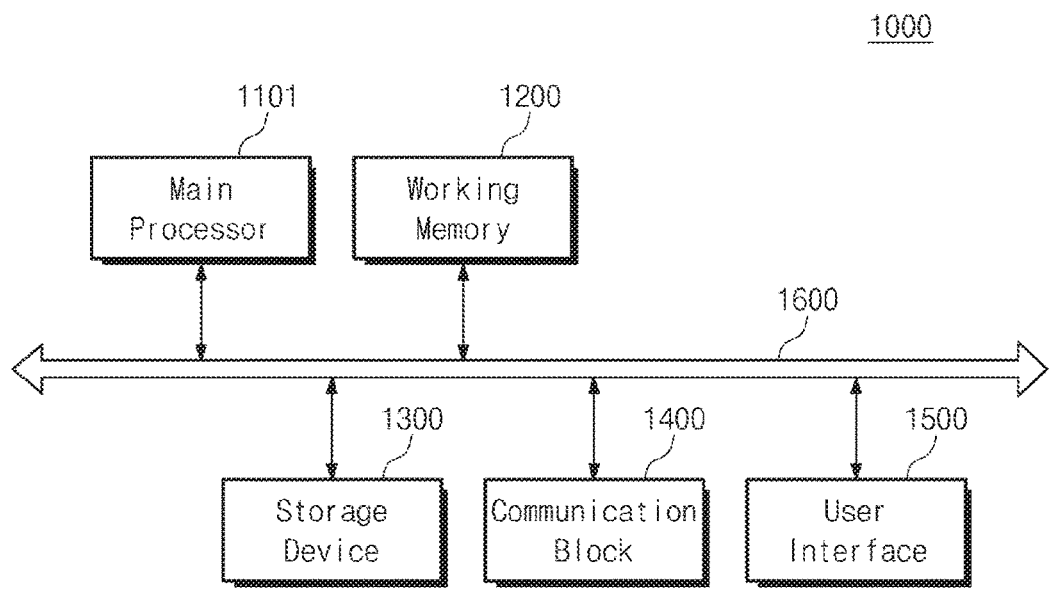
FIG. 1 is a block diagram illustrating an electronic system which includes a storage device according to some example embodiments.

FIG. 1 is a block diagram illustrating an example configuration of an electronic system 1000 which includes a storage device 1300 according to some example embodiments.

The electronic system 1000 may include a main processor 1101, a working memory 1200, the storage device 1300, a communication block 1400, a user interface 1500, and a bus 1600. For example, the electronic system 1000 may be one of electronic devices such as a desktop computer, a laptop computer, a tablet computer, a smart phone, a wearable device, a video game console, a workstation, a server, an electric vehicle, a home appliance, a medical appliance, and/or the like.

The main processor 1101 may control overall operations of the electronic system 1000. The main processor 1101 may process various kinds of arithmetic operations and/or logical operations. To this end, the main processor 1101 may include a special-purpose circuit (e.g., a field programmable gate array (FPGA), application specific integrated chips (ASICs), and/or the like). For example, the main processor 1101 may include one or more processor cores, and may be implemented with a general-purpose processor, a special-purpose processor, or an application processor.

The working memory 1200 may store data to be used in an operation of the electronic system 1000. For example, the working memory 1200 may temporarily store data processed or to be processed by the main processor 1101. For example, the working memory 1200 may include a volatile memory, such as a dynamic random access memory (DRAM), a synchronous DRAM (SDRAM), and/or the like, and/or a nonvolatile memory, such as a phase-change RAM (PRAM), a magneto-resistive RAM (MRAM), a resistive RAM (Re-RAM), a ferro-electric RAM (FRAM), and/or the like.

The storage device 1300 may include one or more memory devices and a controller. The memory device of the storage device 1300 may store data regardless of power being supplied. For example, the storage device 1300 may include a nonvolatile memory, such as a flash memory, a PRAM, an MRAM, a ReRAM, an FRAM, and/or the like. For example, the storage device 1300 may include a storage medium such as a solid state drive (SSD), a card storage, an embedded storage, and/or the like.

The communication block 1400 may communicate with a device/system which is external to the electronic system 1000. For example, the communication block 1400 may support at least one of various wireless communication protocols, such as long term evolution (LTE), worldwide interoperability for microwave access (WIMAX), global system for mobile communication (GSM), code division multiple access (CDMA), Bluetooth, near field communication (NFC), wireless fidelity (Wi-Fi), radio frequency identification (RFID), and/or the like, and/or at least one of various wired communication protocols, such as transfer control protocol/Internet protocol (TCP/IP), universal serial bus (USB), Firewire, and/or the like.

The user interface 1500 may arbitrate communication between a user and the electronic system 1000. For example, the user interface 1500 may include input interfaces such as a keyboard, a mouse, a keypad, a button, a touch panel, a touch screen, a touch pad, a touch ball, a camera, a microphone, a gyroscope sensor, a vibration sensor, and/or the like. For example, the user interface 1500 may include output interfaces such as a liquid crystal display (LCD) device, a light emitting diode (LED) display device, an organic LED (OLED) display device, an active matrix OLED (AMOLED) display device, a speaker, a motor, an LED lamp, and/or the like.

The bus 1600 may provide a communication path between components of the electronic system 1000. The components of the electronic system 1000 may exchange data with one another based on a bus format of the bus 1600. For example, the bus format may include one or more of various interface protocols, such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), and/or the like.

The storage device 1300 may be implemented based on example embodiments of the present disclosure. The storage device 1300 may previously manage a physical address to be allocated for write data, before the write data is received. According to the example embodiments, the storage device 1300 may manage the write data in a small capacity of a buffer. Accordingly, efficiency of managing the storage device 1300 may be improved, and costs of manufacturing the storage device 1300 may decrease. Example configurations and example operations of the storage device 1300 will be described with reference to FIGS. 2 to 20.

The storage device 1300 may be provided as an example in the following descriptions. However, the present disclosure is not limited thereto. The example embodiments may be applied to any type of device which includes a memory device. For example, the example embodiments may be applied even for a volatile memory and/or a nonvolatile memory included in the working memory 1200. The following descriptions are provided to facilitate better understanding, and are not intended to limit the present disclosure.

II-A. Centralized Architecture

Figure 2:
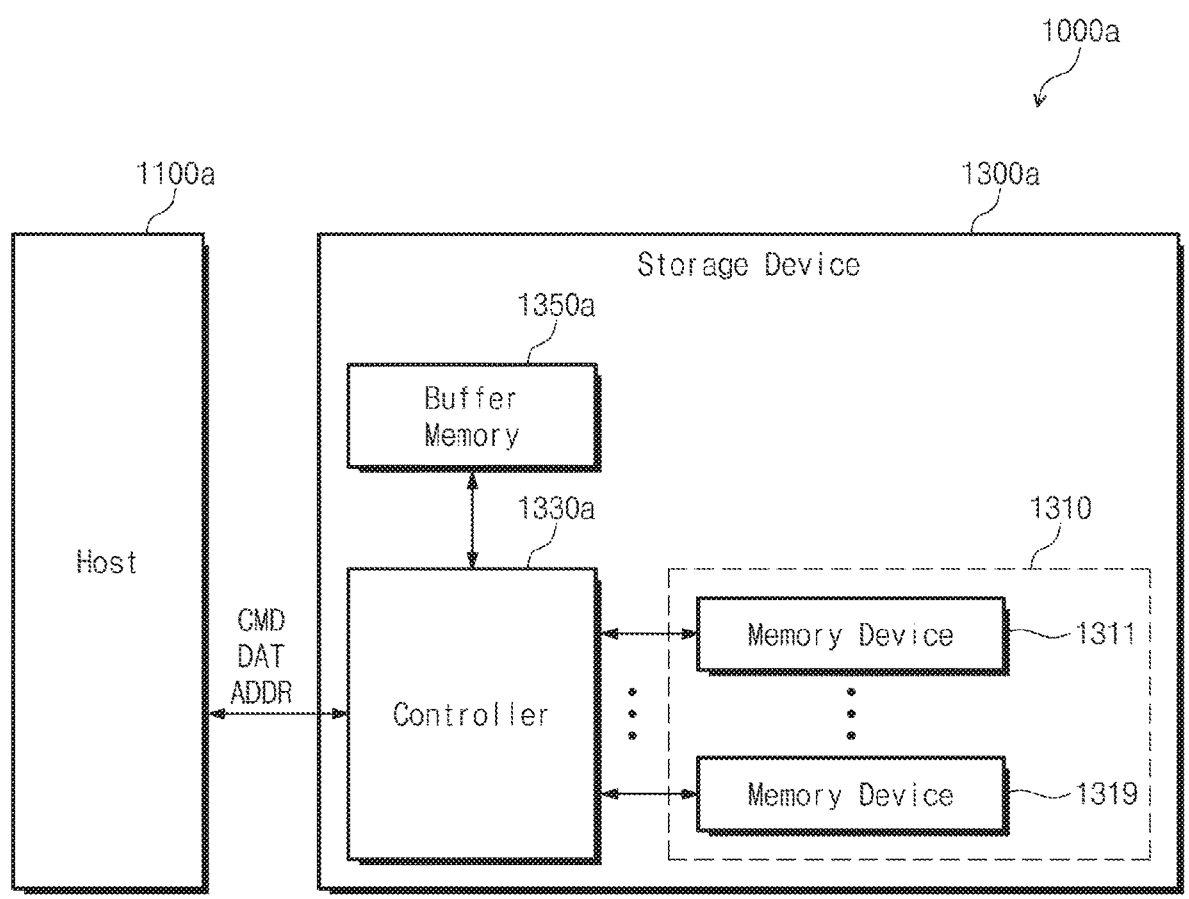
FIG. 2 is a block diagram illustrating an example configuration of a storage device of FIG. 1.

FIG. 2 is a block diagram illustrating an example configuration of the storage device 1300 of FIG. 1. The electronic system 1000 of FIG. 1 may include an electronic system 1000a of FIG. 2. The storage device 1300 of FIG. 1 may include a storage device 1300a of FIG. 2.

As described with reference to FIG. 1, the main processor 1101 may communicate with the storage device 1300a through the bus 1600. In the present disclosure, an object which is able to access the storage device 1300 may be referred to as a "host" 1100a. The main processor 1101 may be an example of objects which are able to operate as the host 1100a. However, the present disclosure is not limited thereto.

The host 1100a may exchange data DAT with the storage device 1300a. The storage device 1300a may provide a storage service with the host 1100a in response to a command CMD received from the host 1100a.

For example, the host 1100a may provide the storage device 1300a with a write command and write data. The storage device 1300a may store the requested write data in response to the write command. For example, the host 1100a may provide a read command to the storage device 1300a. The storage device 1300a may output requested read data to the host 1100a in response to the read command.

The storage device 1300a may include one or more memory devices 1310 and a controller 1330a. FIG. 2 illustrates two memory devices 1311 and 1319, but the number of memory devices included in the storage device 1300a may be variously changed or modified.

Each of the memory devices 1311 and 1319 may store or output data requested by the host 1100a. To this end, each of the memory devices 1311 and 1319 may include memory area(s) for storing data. For example, when each of the memory devices 1311 and 1319 includes a NAND-type flash memory, each of the memory devices 1311 and 1319 may include an array of memory cells formed along a plurality of word lines and a plurality of bit lines, and operations directed to the memory devices 1311 and 1319 may be performed on a memory area of a page unit or a block unit. However, as described with reference to FIG. 1, a type and a configuration of each of the memory devices 1311 and 1319 may be variously changed or modified.

A memory area may be identified and indicated based on a value which is called an "address". Write data may be stored in a memory area indicated by an address, and read data may be output from a memory area indicated by an address.

The host 1100a may provide an address ADDR to the storage device 1300a, to exchange data with regard to a specific memory area of the memory devices 1311 and 1319. The storage device 1300a may control the memory devices 1311 and 1319 based on a request (e.g., the command CMD) and the address ADDR which are received from the host 1100a.

Meanwhile, the address ADDR processed by the host 1100a may be different from an address indicating a memory area in the memory devices 1311 and 1319. For example, the address ADDR processed by the host 1100a may be referred to as a "logical address", and an address for the memory devices 1311 and 1319 may be referred to as a "physical address". The storage device 1300a may perform address translation between a logical address processed by the host 1100a and a physical address for the memory devices 1311 and 1319, to control the memory devices 1311 and 1319 suitably.

The controller 1330a may control overall operations of the storage device 1300a. For example, the controller 1330a may schedule operations of the memory devices 1311 and 1319, or may encode and decode signals/data processed in the storage device 1300a. For example, the controller 1330a may control the memory devices 1311 and 1319 such that the memory devices 1311 and 1319 store or output data.

The controller 1330a may include one or more hardware components (e.g., an analog circuit, a logic circuit, and/or the like) which are configured to perform some operations described above and to be described below. In addition, the controller 1330a may include one or more processor cores. Some operations of the controller 1330a described above and to be described below may be implemented with a program code of software and/or firmware, and the processor core(s) of the controller 1330a may execute an instruction set of the program code. The processor core(s) of the controller 1330a may process various kinds of arithmetic operations and/or logical operations to execute the instruction set.

A buffer memory 1350a may buffer data used in an operation of the storage device 1300a. For example, the buffer memory 1350a may temporarily store data which is referenced by the controller 1330a. For example, the buffer memory 1350a may include a volatile memory such as a static RAM (SRAM), a DRAM, an SDRAM, and/or the like, and/or a nonvolatile memory such as a flash memory, a PRAM, an MRAM, a ReRAM, an FRAM, and/or the like.

In the example configuration of FIG. 2, the processor core of the controller 1330a may intervene in various operations which are performed in the storage device 1300a, including transferring write data and read data. In addition, the buffer memory 1350a may store various metadata which is referenced for an operation of the controller 1330a, as well as write data to be stored in the memory devices 1311 and 1319 and read data output from the memory devices 1311 and 1319. Accordingly, it may be understood that the example storage device 1300a of FIG. 2 is implemented with a "centralized architecture" (e.g., which is centralized according to control of the controller 1330a).

II-B. Management of Multi-Stream and Memory Region

Figure 3:
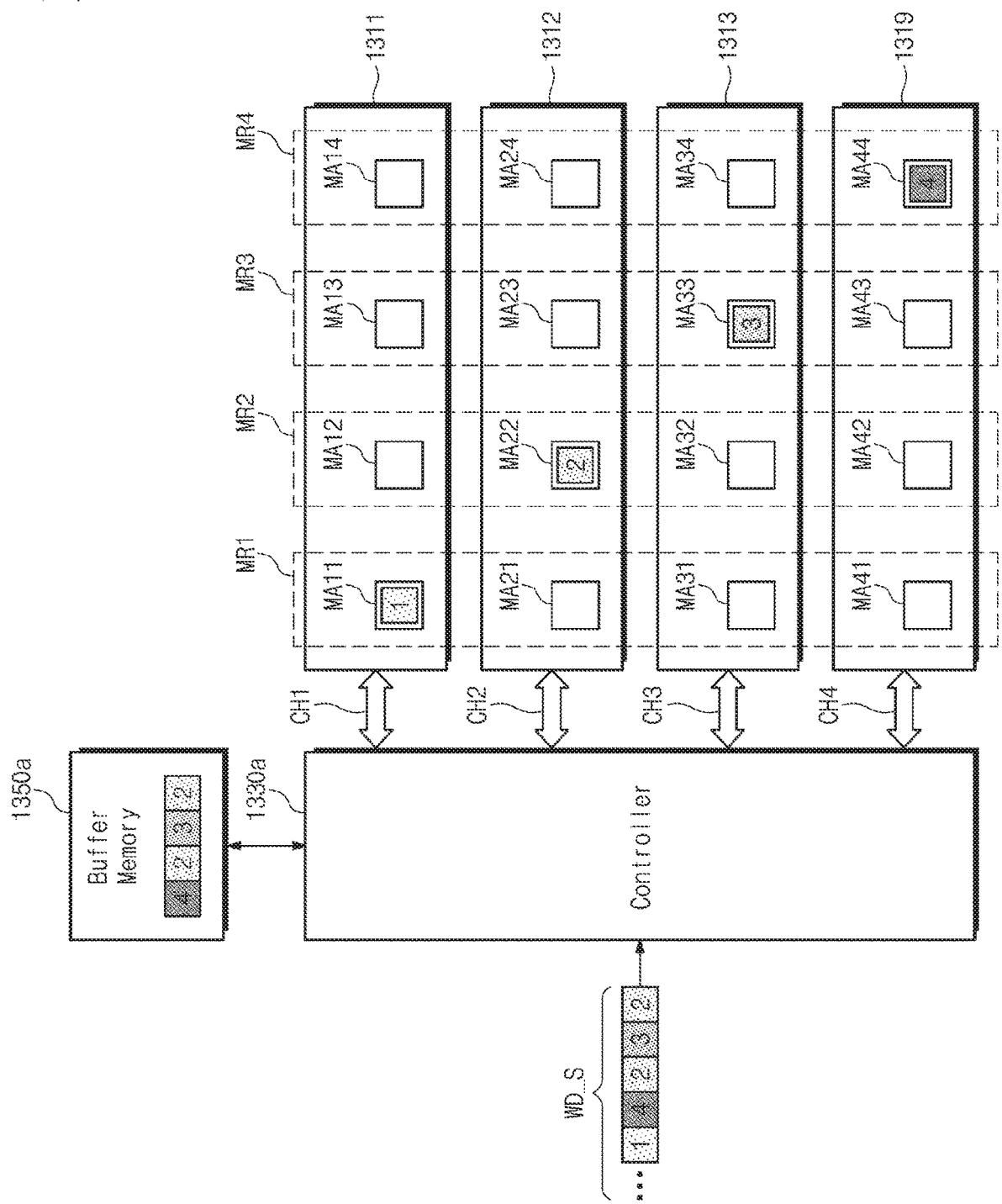
FIG. 3 is a block diagram for describing an example configuration of a memory device of FIG. 2 according to some example embodiments.
Figure 4:
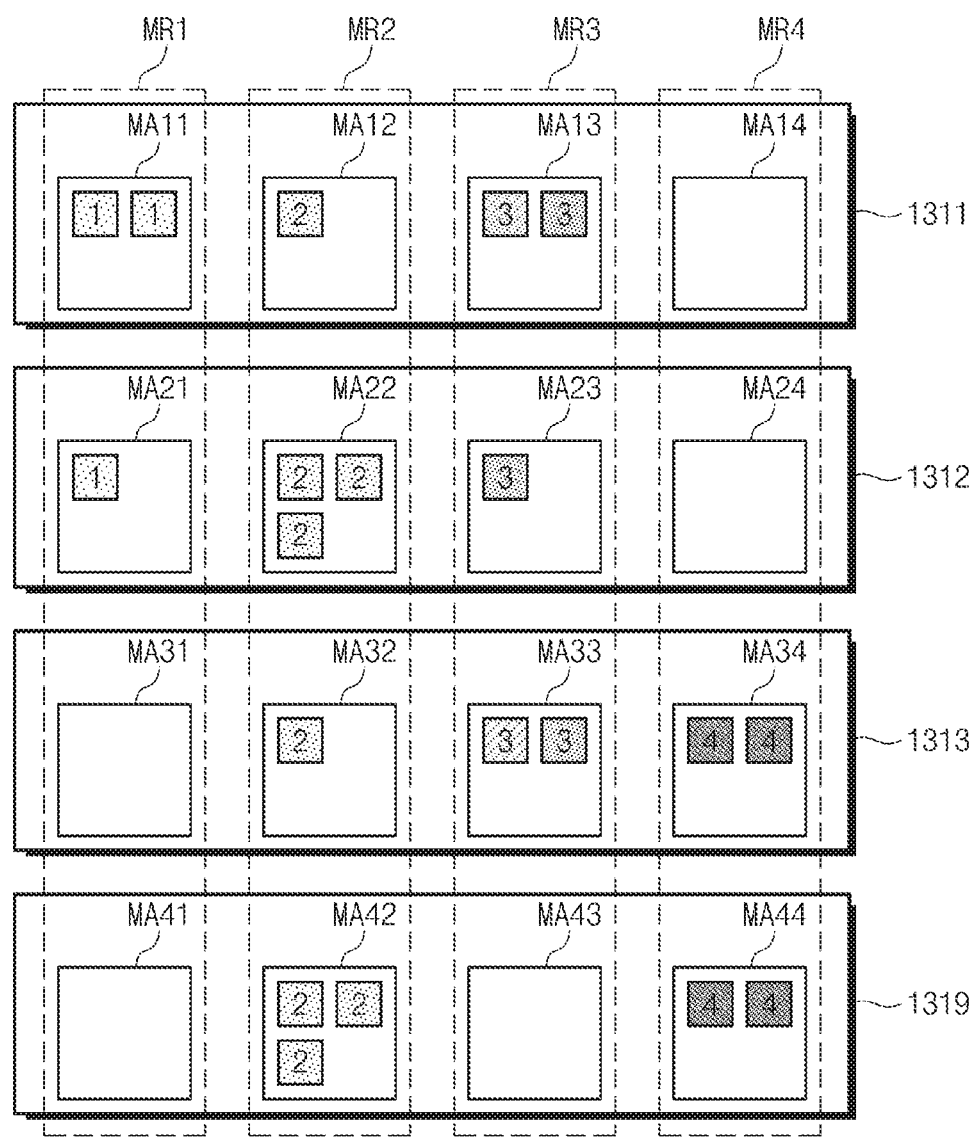
FIGS. 4 and 5 are conceptual diagrams for describing example configurations of a memory device of FIG. 2 according to some example embodiments.
Figure 5:
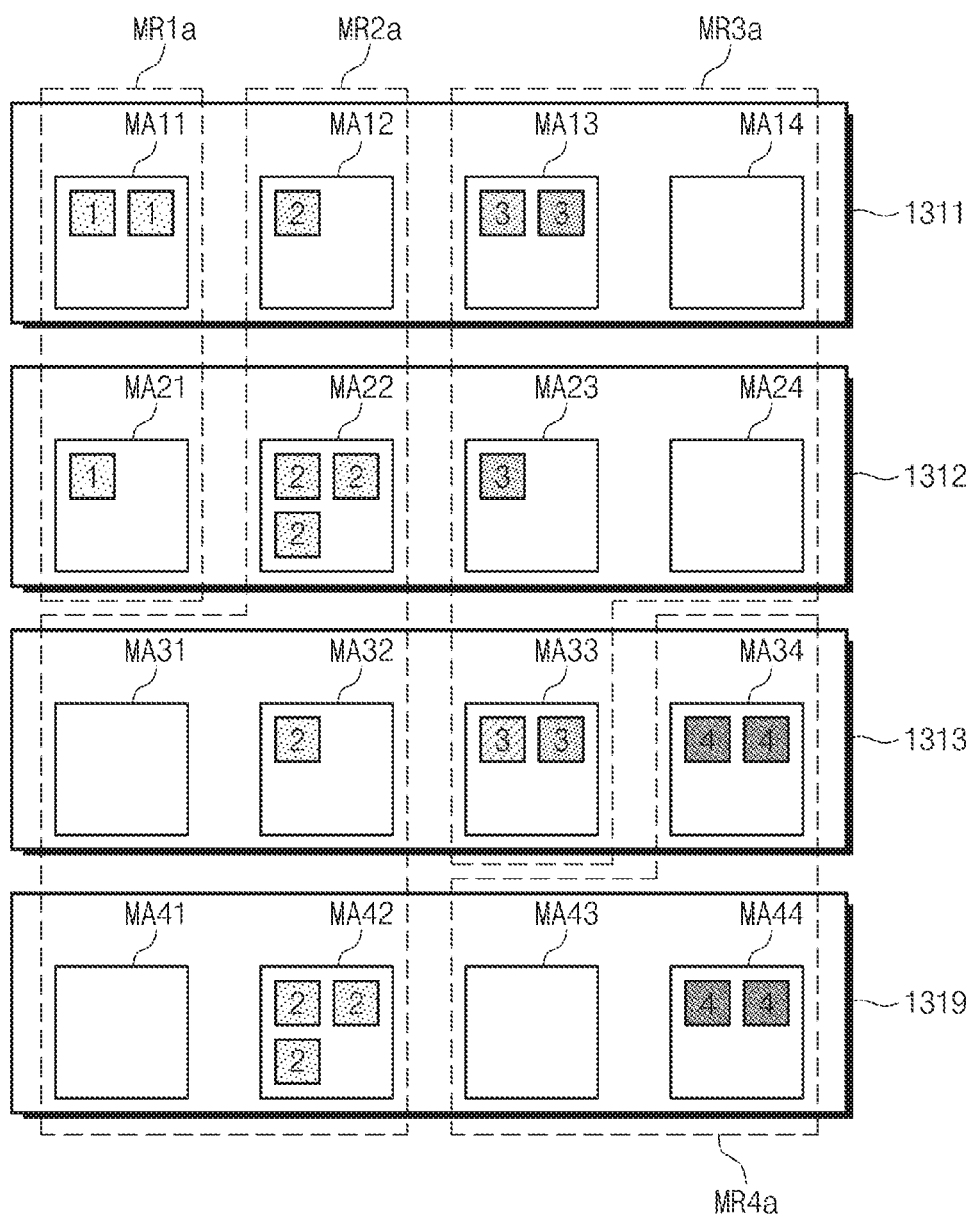

FIG. 3 is a block diagram for describing an example configuration of the memory device 1310 of FIG. 2 according to some example embodiments. FIGS. 4 and 5 are conceptual diagrams for describing example configurations of the memory device 1310 of FIG. 2 according to some example embodiments. For example, it will be described that the storage device 1300a includes four memory devices 1311, 1312, 1313, and 1319. However, this example is provided to facilitate better understanding, and the number of memory devices may be variously changed or modified.

In some example embodiments, the storage device 1300a may manage data flow according to a multi-stream scheme. For example, a stream may be associated with a data characteristic. The host 1100a may transfer several pieces of data having the same or similar characteristic through one stream to the storage device 1300a. On the other hand, the host 1100a may transfer several pieces of data having different characteristics through different streams to the storage device 1300a.

For example, system data may be transferred through one stream separately from user data. For example, several pieces of data generated during the same time period may be transferred through one stream separately from data generated during different time periods. For example, several pieces of data generated by the same user may be transferred through one stream separately from data generated by different users. These are just some examples associated with data characteristics, and a data characteristic may be changed or modified based on various factors such as an operation policy of the host 1100a and the storage device 1300a, a user's intention, and/or the like.

A stream may be handled based on a stream identifier, which is allocated to data. The stream identifier may be differently allocated based on a data characteristic. For example, referring to FIG. 3, a shaded square marked by a digit may mean write data having a stream identifier of the marked digit. For example, several pieces of data having a stream identifier of "1" may have the same or similar characteristic, and a characteristic of data having a stream identifier of "1" may be different from a characteristic of data having a stream identifier of "2".

For example, a description will be given of four stream identifiers being handled. In this example, the controller 1330a may manage data flow taking into account four different data characteristics. However, this example is provided to facilitate better understanding, and the number of characteristics and stream identifiers may be variously changed or modified.

Each of the memory devices 1311, 1312, 1313, and 1319 may include memory areas. For example, the memory device 1311 may include memory areas MA11 to MA14. Similarly, the memory devices 1312, 1313, and 1319 may include memory areas MA21 to MA24, memory areas MA31 to MA34, and memory areas MA41 to MA44, respectively.

For example, each of the memory areas MA11 to MA14, MA21 to MA24, MA31 to MA34, and MA41 to MA44 may correspond to a block size area, and the present disclosure is not limited to this example. The memory areas MA11 to MA14, MA21 to MA24, MA31 to MA34, and MA41 to MA44 may be variously changed or modified so as not to overlap one another. The memory areas MA11 to MA14, MA21 to MA24, MA31 to MA34, and MA41 to MA44 may have the same size or different sizes.

FIG. 3 illustrates that each memory device includes four memory areas identically, but the present disclosure is not limited to illustration of FIG. 3. Sizes and the number of memory areas included in each memory device may be variously changed or modified. Sizes and the number of memory areas included in each memory device may be identical or different.

Each of the memory devices 1311, 1312, 1313, and 1319 may be connected to one of a plurality of channels CH1 to CH4. Accordingly, each of the memory areas MA11 to MA14, MA21 to MA24, MA31 to MA34, and MA41 to MA44 may be connected to one of the channels CH1 to CH4. The controller 1330a may communicate with the memory devices 1311, 1312, 1313, and 1319 through the channels CH1 to CH4. The channels CH1 to CH4 may include physical circuits, such as conductive lines and buffer circuits, to transfer data between the controller 1330a and the memory devices 1311, 1312, 1313, and 1319.

The memory devices 1311, 1312, 1313, and 1319 may include memory regions MR1 to MR4. Each of the memory regions MR1 to MR4 may include at least one memory area. The memory regions MR1 to MR4 may not overlap one another. Accordingly, memory areas respectively included in the memory regions MR1 to MR4 may be different. For example, memory areas included in the memory region MR1 may be different from memory areas included in the memory region MR2.

The storage device 1300a may separately store several pieces of write data, which are transferred through different streams, in different memory regions. On the other hand, the storage device 1300a may store several pieces of write data, which are transferred through one stream, in the same memory region together. For example, several pieces of write data having a stream identifier of "1" may be stored in the memory region MR1 together. On the other hand, write data having a stream identifier of "2" may be stored in the memory region MR2 separately from the memory region MR1, and may not be stored in the memory region MR1.

Accordingly, one memory region may store several pieces of write data having the same or similar characteristic. For example, write data having a first characteristic (e.g., write data having a stream identifier of "1") may be stored only in the memory region MR1, and write data having a second characteristic (e.g., write data having a stream identifier of "2") may be stored only in the memory region MR2.

According to such a multi-stream scheme, several pieces of write data having the same or similar characteristic may be managed in the same memory region together. Accordingly, efficiency of allocating a new memory area for write data may be improved, and thus performance of a write operation may be improved. In addition, the number of garbage collection operations for restoring a page of invalid data and securing a free page may decrease, and thus lifespan of the storage device 1300a may be prevented from being rapidly shortened.

A configuration of the memory regions MR1 to MR4 may be variously changed or modified. Each of the memory regions MR1 to MR4 may include at least one memory area which is selected from memory areas connected to the same channel. Meanwhile, the memory regions MR1 to MR4 may respectively include different memory areas which are selected from memory areas connected to the same channel.

For example, the memory region MR1 may include the memory area MA11 connected to the channel CH1. When the memory area MA11 is included in the memory region MR1, the memory area MA11 may not be included in the memory region MR2. Instead, the memory region MR2 may include the memory area MA12 connected to the channel CH1. In such a manner, the memory regions MR1 to MR4 may not overlap one another.

Memory areas included in each of the memory regions MR1 to MR4 may be selected in association with all or some of the channels CH1 to CH4. Accordingly, each of the memory regions MR1 to MR4 may include memory areas which are respectively connected to all or some of the channels CH1 to CH4.

For example, referring to FIG. 4, each of the memory regions MR1 to MR4 may include memory areas selected in association with all the channels CH1 to CH4. For example, the memory region MR1 may include the memory areas MA11, MA21, MA31, and MA41 respectively connected to the channels CH1, CH2, CH3, and CH4.

For example, referring to FIG. 5, each of memory regions MR1a, MR3a, and MR4a may include memory areas selected in association with some of the channels CH1 to CH4. For example, the memory region MR1a may include the memory areas MA11 and MA21 respectively connected to the channels CH1 and CH2, and may not include any memory area selected in association with the channels CH3 and CH4. Meanwhile, the memory region MR2a may include memory areas selected in association with all the channels CH1 to CH4.

Each of the memory regions MR1a to MR4a may include at least one memory area connected to the same channel. For example, the memory region MR1a may include one memory area connected to a channel. On the other hand, each of the memory regions MR2a, MR3a, and MR4a may include a plurality of memory areas connected to the same channel. For example, the memory region MR1a may include one memory area MA11 connected to the channel CH1, and the memory region MR3a may include two memory areas MA13 and MA14 connected to the channel CH1.

FIGS. 4 and 5 illustrate some of possible configurations of the memory regions MR1 to MR4, and a configuration of the memory regions MR1 to MR4 may be changed or modified to be different from the illustrations of FIGS. 4 and 5. Memory areas included in each of the memory regions MR1 to MR4 may be adjacent to each other, or may be discontinuous.

A configuration of the memory regions MR1 to MR4 may be fixed statically or may vary dynamically. Returning back to FIG. 3, the controller 1330a may select or change a configuration of the memory regions MR1 to MR4, and may set or refer to the selected or changed configuration of the memory regions MR1 to MR4.

For example, the controller 1330a may monitor an amount of write data having a specific stream identifier. For example, the controller 1330a may monitor distribution of memory areas such as an invalid area in which invalid data is stored, an available free or spare area, a used area in which write data is stored, and/or the like. The controller 1330a may change attributes, such as sizes and locations, of the memory regions MR1 to MR4 based on the monitored amount and/or distribution. For example, when distribution of memory areas is changed by garbage collection, attributes of the memory regions MR1 to MR4 may also be changed. However, these examples are provided to facilitate better understanding, and are not intended to limit the present disclosure.

The controller 1330a may receive a write data stream WD_S (e.g., from the host 1100a). The write data stream WD_S may be understood as data flow which includes a series of write data having one or more stream identifiers. Write data included in the write data stream WD_S may be stored in one of the memory regions MR1 to MR4 based on a stream identifier.

The buffer memory 1350a may buffer write data to be stored in the memory devices 1311, 1312, 1313, and 1319. The controller 1330a may communicate with the buffer memory 1350a and the memory devices 1311, 1312, 1313, and 1319 such that write data is stored in the memory devices 1311, 1312, 1313, and 1319. The controller 1330a may control the memory devices 1311, 1312, 1313, and 1319 such that write data is stored in the memory devices 1311, 1312, 1313, and 1319. An example write operation for storing write data in the memory devices 1311, 1312, 1313, and 1319 will be described with reference to FIGS. 7 and 8.

In some example embodiments, the buffer memory 1350a will be described and illustrated as buffering write data. However, these example embodiments are provided to facilitate better understanding, and are not intended to limit the present disclosure. In some example embodiments, write data may be buffered in an internal memory of the controller 1330a or in another auxiliary memory.

II-C. Example Write Operation

Figure 6:
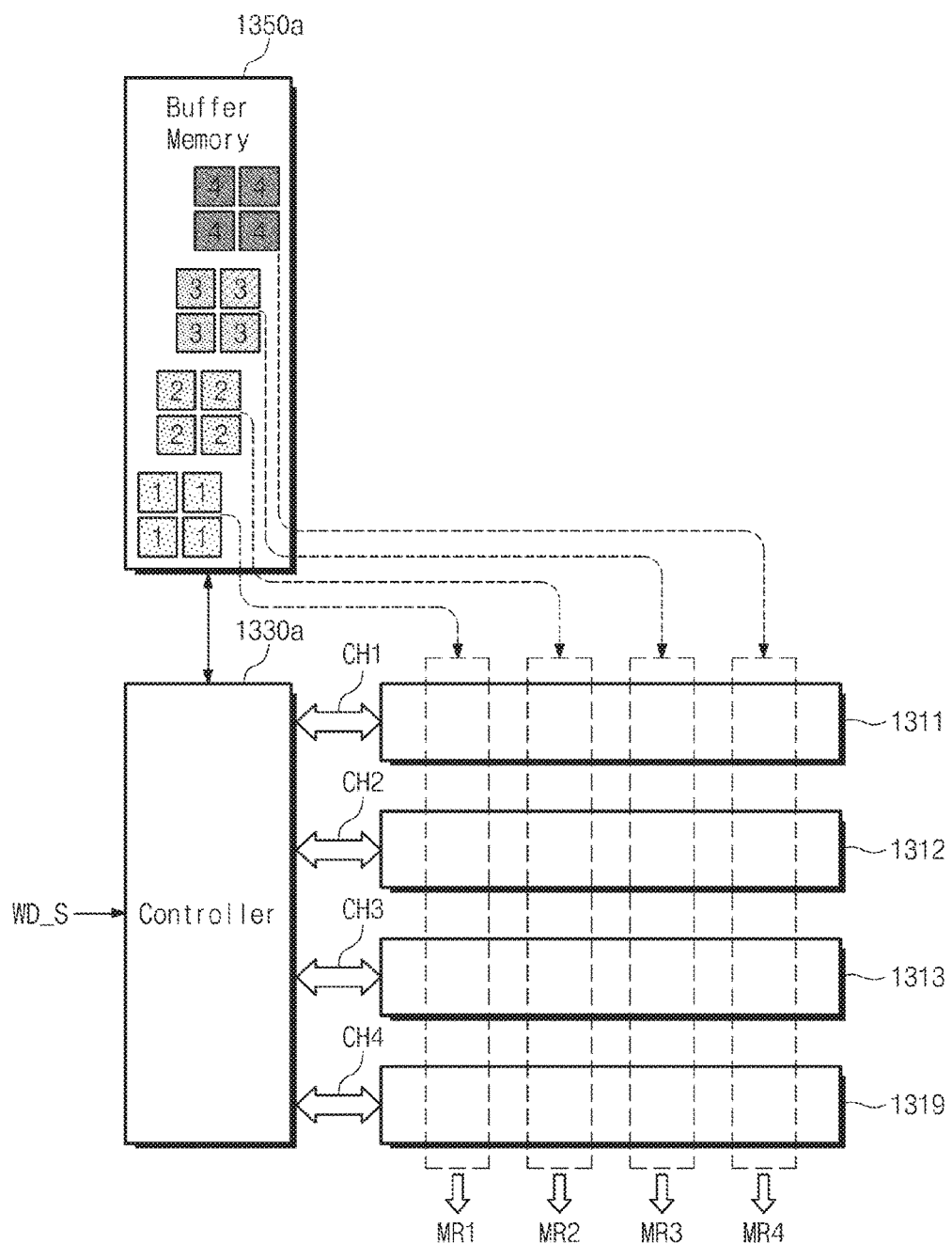
FIG. 6 is a block diagram for describing an example write operation in a storage device of FIG. 2.

FIG. 6 is a block diagram for describing an example write operation of the storage device 1300a of FIG. 2.

The write data stream WD_S received by the controller 1330a may include a series of write data. The write data included in the write data stream WD_S may be buffered in the buffer memory 1350a. For example, the write data may accompany a logical address.

Meanwhile, the controller 1330a may translate a logical address into a physical address. The physical address may indicate a location of a specific memory area or a specific memory region on the memory devices 1311, 1312, 1313, and 1319. The controller 1330a may allocate the translated physical address for the write data.

In some cases, the buffer memory 1350a may buffer write data until write data of all stream identifiers are fully or sufficiently buffered. For example, when four stream identifiers are handled, as illustrated in FIG. 6, the buffer memory 1350a may buffer write data until write data of all the four stream identifiers are fully buffered.

After write data of all stream identifiers are sufficiently buffered, the controller 1330a may allocate physical addresses for the write data. Afterwards, under control of the controller 1330a, the write data may be stored in respective memory areas indicated by the allocated physical addresses. Write data of all stream identifiers may be stored in respective memory areas indicated by the allocated physical addresses in parallel (e.g., simultaneously or concurrently) or sequentially.

The memory regions MR1 to MR4 may be managed based on the stream identifiers of the write data stored in the respective memory areas. For example, when write data having a stream identifier of "1" is stored in a specific memory area of the memory device 1311, the controller 1330a may manage the specific memory area as the memory region MR1. For example, the memory region MR1 may be determined after write data having a stream identifier of "1" is received and stored. In such a manner, write data may be managed in a memory area included in a memory region which corresponds to a stream identifier.

The multi-stream scheme may be employed to efficiently manage several pieces of write data having the same or similar characteristic. However, when physical addresses are allocated for write data of some stream identifiers before write data of all stream identifiers are buffered, distribution of used areas may become messy, and it may be difficult to efficiently manage write data of other disregarded stream identifiers. Accordingly, it may be advantageous to, after write data of all stream identifiers are buffered, allocate physical addresses of respective memory areas to store write data.

However, when write data of all stream identifiers are buffered, a large amount of resource may be required in the buffer memory 1350a. For example, it may be required to increase a capacity of the buffer memory 1350a correspondingly to the number of stream identifiers, or the number of buffer memories may need to be as many as the number of stream identifiers. This may degrade efficiency of managing the storage device 1300a, and may increase costs of manufacturing the storage device 1300a.

Figure 7:
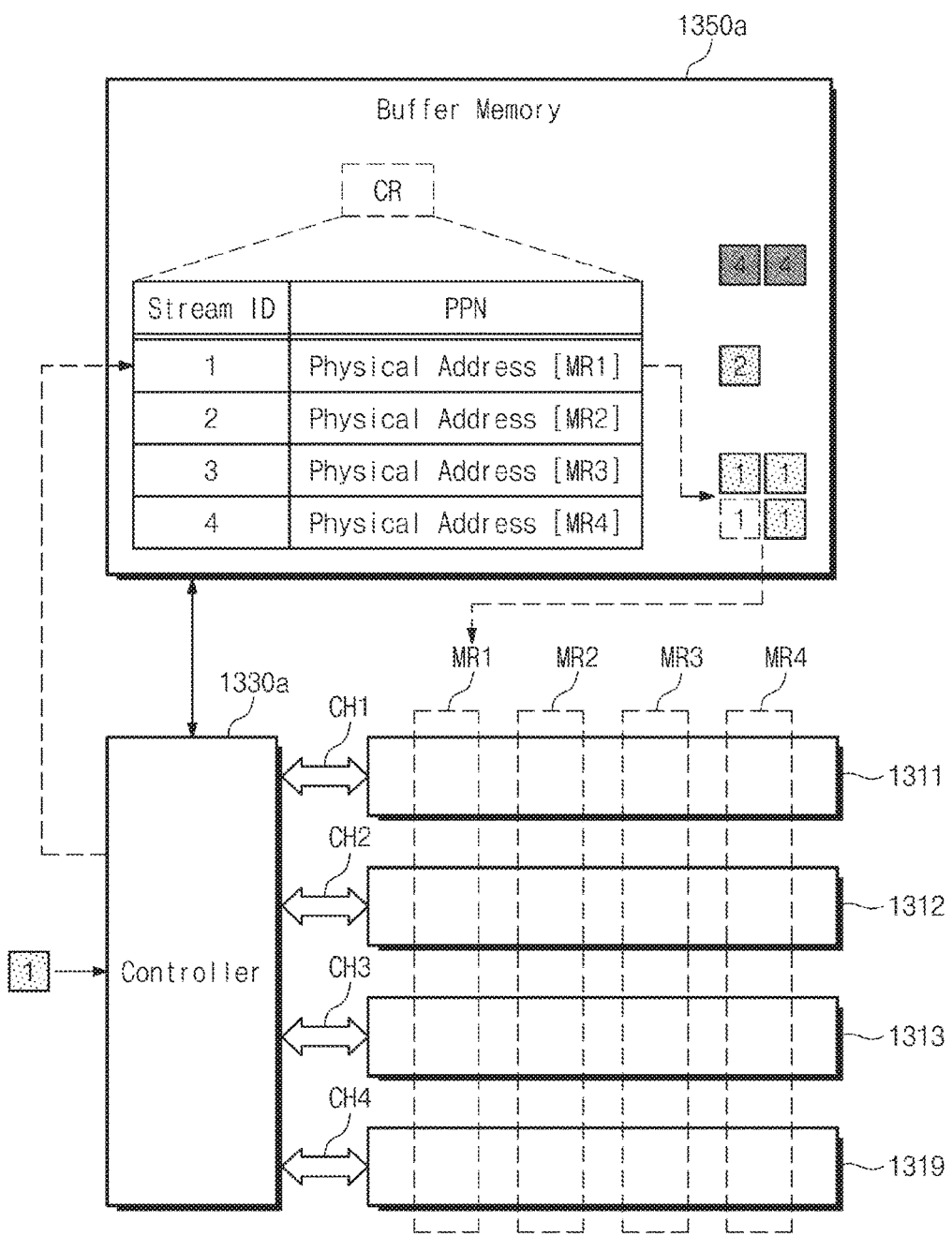
FIG. 7 is a block diagram for describing an example write operation performed in a storage device of FIG. 2 according to some example embodiments.
Figure 8:
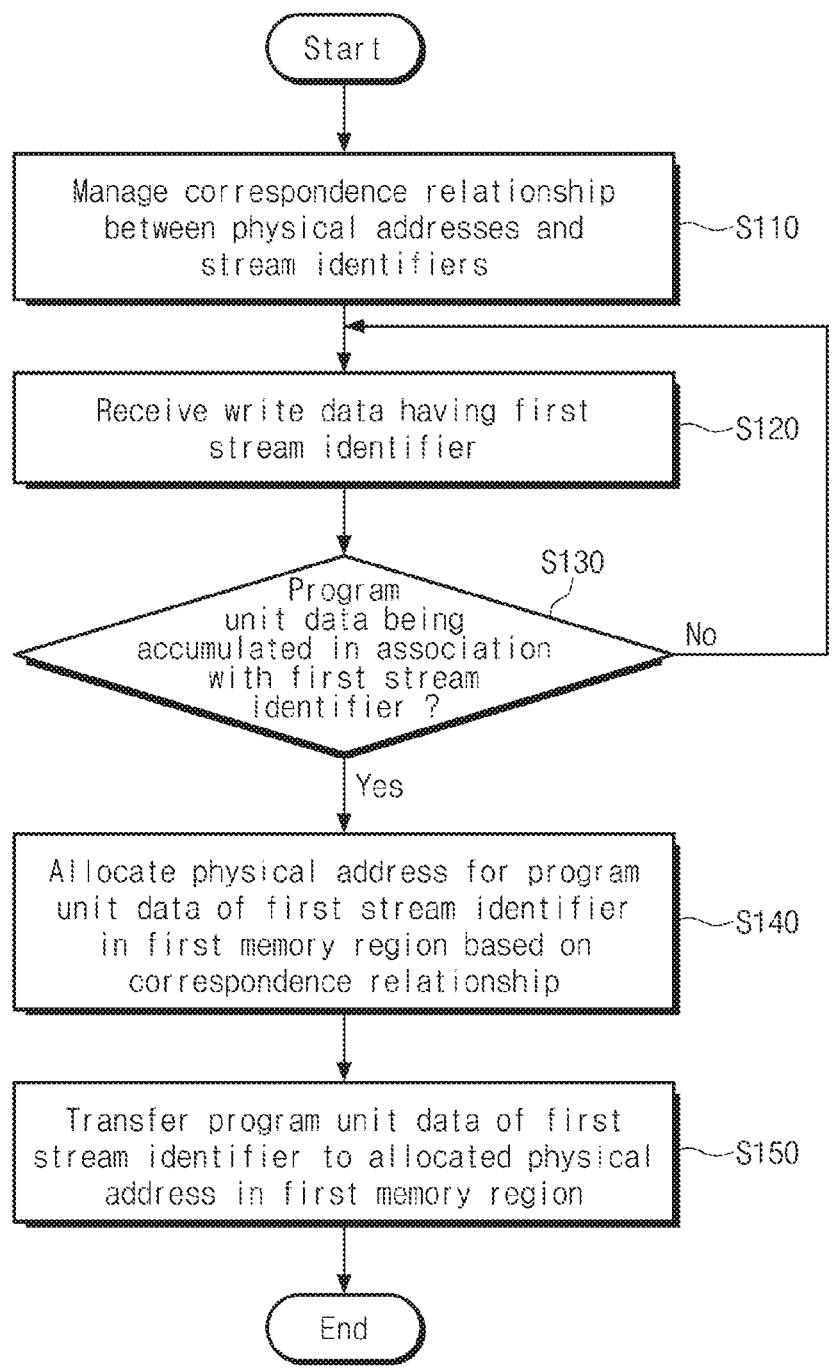
FIG. 8 is a flowchart describing an example write operation performed in a storage device of FIG. 2 according to some example embodiments.

FIG. 7 is a block diagram for describing an example write operation performed in the storage device 1300a of FIG. 2 according to some example embodiments. FIG. 8 is a flowchart describing an example write operation performed in the storage device 1300a of FIG. 2 according to some example embodiments. To facilitate better understanding, FIGS. 7 and 8 will be described together.

In some example embodiments, the controller 1330a may manage a correspondence relationship CR between physical addresses and stream identifiers (operation S110 of FIG. 8). The correspondence relationship CR may be previously managed before write data (or the write data stream WD_S including a series of write data) is received by the controller 1330a. Accordingly, the correspondence relationship CR may be previously managed before the write data is buffered in the buffer memory 1350a.

For example, information of the correspondence relationship CR may be stored in the buffer memory 1350a as illustrated in FIG. 7. However, the present disclosure is not limited thereto, and unlike the illustration of FIG. 7, the information of the correspondence relationship CR may be stored in an internal memory of the controller 1330a or the memory devices 1311, 1312, 1313, and 1319. The controller 1330a may access the stored information of the correspondence relationship CR, to process subsequent operations.

In the correspondence relationship CR, one stream identifier may correspond to one or more physical addresses indicating one memory region. For example, one stream identifier may be managed to correspond to physical addresses which indicate memory areas included in one memory region. For example, a stream identifier of "1" associated with a first characteristic may be managed in the correspondence relationship CR so as to correspond to a physical address associated with the memory region MR1, and a stream identifier of "2" associated with a second characteristic may be managed in the correspondence relationship CR so as to correspond to a physical address associated with the memory region MR2.

However, in some example embodiments, one stream identifier may correspond to physical addresses indicating a plurality of memory regions, or a plurality of stream identifiers may correspond to physical addresses indicating one memory region. The correspondence relationship CR may be variously changed or modified to efficiently manage pieces of data having the same or similar characteristics in one or selected more memory regions.

The controller 1330a may suitably select or set the correspondence relationship CR, taking into account distribution and locations of an available area, an invalid area, and a used area. However, the controller 1330a may previously manage the correspondence relationship CR before receiving write data. In some example embodiments, as described above, the controller 1330a may monitor statuses of the memory devices 1311, 1312, 1313, and 1319 to change attributes (e.g., sizes, locations, and/or the like) of the memory regions MR1 to MR4 dynamically. Accordingly, the correspondence relationship CR may vary according to operations of the memory devices 1311, 1312, 1313, and 1319.

After the correspondence relationship CR is prepared, the controller 1330a may receive write data having a specific stream identifier (operation S120 of FIG. 8). In some example embodiments, the controller 1330a may allocate a physical address, which corresponds to the specific stream identifier, for the received write data based on the correspondence relationship CR. The controller 1330a may control the memory devices 1311, 1312, 1313, and 1319 such that the received write data is stored in a memory region of the allocated physical address. Accordingly, write data may be managed in a memory region corresponding to a stream identifier.

For example, when the controller 1330a receives write data having a stream identifier of "1", the controller 1330a may obtain a physical address corresponding to the stream identifier of "1", with reference to the correspondence relationship CR. The obtained physical address may indicate the memory region MR1. The controller 1330a may allocate the obtained physical address for the write data. Under control of the controller 1330a, the received write data may be stored in memory areas of the allocated physical address, i.e., in the memory region MR1.

In some cases, a size of write data received by the controller 1330a may be different from a program unit size of program unit data which is stored by one single write operation. For example, the write operation may be performed once to store program unit data of 32 kilobytes (KB) in the memory devices 1311, 1312, 1313, and 1319, while the host 1100a may provide the storage device 1300a with write data of 4 KB which is smaller than the program unit size.

In this case, under control of the controller 1330a, the buffer memory 1350a may buffer a plurality of pieces of write data associated with a specific stream identifier until the program unit data is accumulated with regard to the specific stream identifier. For example, when write data having a stream identifier of "1" is received, the buffer memory 1350a may buffer the received write data together with one or more pieces of other write data having the stream identifier of "1". The plurality of pieces of write data having the stream identifier of "1" may be buffered until program unit data (i.e., a program unit of data) is accumulated with regard to the stream identifier of "1".

The controller 1330a may determine whether program unit data is accumulated with regard to a specific stream identifier (operation S130 of FIG. 8). When the program unit data is not accumulated ("No" of operation S130 of FIG. 8), next write data may be received (operation S120 of FIG. 8).

When the program unit data is accumulated ("Yes" of operation S130 of FIG. 8), the controller 1330a may allocate a physical address for the program unit data (operation S140 of FIG. 8). The controller 1330a may allocate a physical address corresponding to a stream identifier of the program unit data, based on the correspondence relationship CR. For example, when the program unit data is accumulated with regard to a stream identifier of "1", the controller 1330a may allocate a physical address indicating the memory region MR1 for the program unit data, based on the correspondence relationship CR.

Afterwards, the controller 1330a may transfer the program unit data to a memory region which is indicated by the physical address allocated based on the correspondence relationship CR (operation S150 of FIG. 8). Program unit data may be transferred to a memory region which includes a memory area indicated by an allocated physical address. For example, the program unit data accumulated with regard to the stream identifier of "1" may be transferred to a memory area which is indicated by the allocated physical address of the memory region MR1.

Accordingly, program unit data may be stored in a memory region corresponding to a stream identifier. Herein, one program unit data may include write data having a specific stream identifier and one or more pieces of other write data having the same stream identifier.

Under control of the controller 1330a, a plurality of pieces of write data having the same stream identifier may be stored in the same memory region together. The controller 1330a may communicate with the memory devices 1311, 1312, 1313, and 1319 and the buffer memory 1350a such that program unit data including the plurality of pieces of write data is stored in an intended memory region.

When the correspondence relationship CR is used, a memory region in which write data having a specific stream identifier is to be stored may be previously determined before the write data is received. For example, before write data having a stream identifier of "1" and write data having a stream identifier of "2" are received by the controller 1330a and then buffered in the buffer memory 1350a, the memory region MR1 may be previously determined to store the write data having the stream identifier of "1" and the memory region MR2 may be previously determined to store the write data having the stream identifier of "2".

The memory regions MR1 to MR4 and the correspondence relationship CR may be variously changed or modified to be suitable to manage several pieces of write data having the same or similar characteristic together. As described above, the memory regions MR1 to MR4 and the correspondence relationship CR may be fixed statically or may vary dynamically.

Unlike the example of FIG. 6, the example write operation of FIG. 7 may not require buffering of write data of all stream identifiers. Accordingly, once write data having a specific stream identifier (or program unit data including the write data) is received (or buffered), the write data (or the program unit data) may be transferred to a memory region corresponding to the specific stream identifier based on the correspondence relationship CR. In addition, the write data (or the program unit data) may be transferred to the memory regions MR1 to MR4 as soon as being received (or buffered), regardless of an order or a configuration of a stream identifier.

Write data having a specific stream identifier may be transferred to the memory devices 1311, 1312, 1313, and 1319 without considering write data having other stream identifier(s). For example, write data having a stream identifier of "1" may be transferred to the memory region MR1 based on the correspondence relationship CR, regardless of whether write data having a stream identifier of "2" is received by the controller 1330a or is buffered in the buffer memory 1350a.

For example, the controller 1330a may control the buffer memory 1350a and the memory devices 1311, 1312, 1313, and 1319 such that write data having a stream identifier of "2" is stored in the memory region MR2 based on the correspondence relationship CR. Similarly, the write data having the stream identifier of "2" may be transferred to the memory region MR2 of the memory devices 1311, 1312, 1313, and 1319 without considering write data having a stream identifier of "1", "3", or "4".

According to the example write operation of FIG. 7, write data of all stream identifiers may not be fully buffered at the same time, and thus the storage device 1300 may manage write data in a small capacity of a buffer. For example, the buffer memory 1350a may be implemented to have a small capacity, or a small number of buffer memories may be provided. Alternatively, write data may be managed by use only of an internal memory of a small capacity in the controller 1330a. Accordingly, efficiency of managing the storage device 1300 may be improved, and costs of manufacturing the storage device 1300 may decrease.

II-D. Supplements

Figure 9:
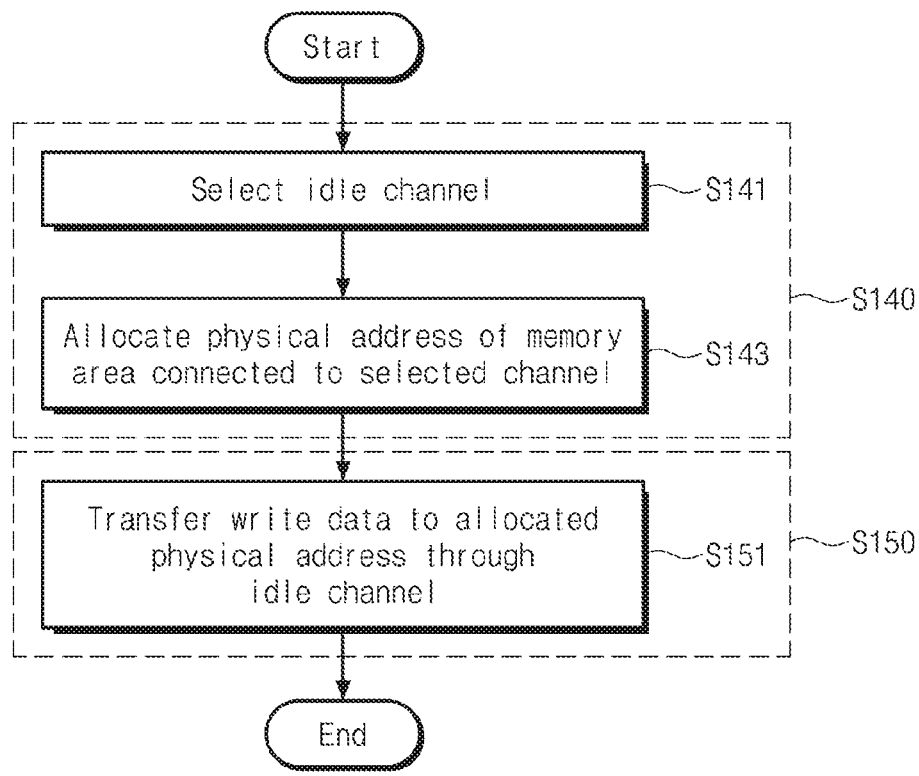
FIG. 9 is a flowchart describing interleaving through a plurality of channels with regard to an example write operation of FIGS. 7 and 8.

FIG. 9 is a flowchart describing interleaving through a plurality of channels CH1 to CH4 with regard to the example write operation of FIGS. 7 and 8. For example, the interleaving of FIG. 9 may be performed after write data is prepared (operation S120 of FIG. 8) or program unit data is prepared (operation S130 of FIG. 8).

A physical address may be allocated for the write data or the program unit data (operation S140). To this end, in some example embodiments, the controller 1330a may select an idle channel among the channels CH1 to CH4 (operation S141). If a specific channel is not idle, the controller 1330a may select another idle channel. The controller 1330a may allocate a physical address of a memory area connected to the selected channel, for the write data or the program unit data (operation S143).

Afterwards, the controller 1330a may transfer the write data or the program unit data to the memory area of the allocated physical address (operation S150). Herein, the write data or the program unit data may be transferred through the selected idle channel (operation S151). Accordingly, the write data or the program unit data may be stored in the memory devices 1311, 1312, 1313, and 1319.

For example, referring to FIGS. 7 and 9, write data having a stream identifier of "1" may be stored in a memory area which is connected to the channel CH1, from among memory areas included in the memory region MR1. When the channel CH1 is occupied, the channel CH1 may not be idle. For example, the channel CH2 may be idle while the channel CH1 is not idle. In this case, the controller 1330a may select the channel CH2 to transfer write data having a stream identifier of "2".

The controller 1330a may allocate a physical address of a memory area which is connected to the channel CH2, from among memory areas included in the memory region MR2, for the write data having the stream identifier of "2". Accordingly, the write data having the stream identifier of "2" may be transferred through the idle channel CH2, and may be stored in the memory area of the allocated physical address.

In such a manner, transferring a plurality of pieces of write data from the controller 1330a to the memory devices 1311, 1312, 1313, and 1319 may interleave through the channels CH1 to CH4. As write data is transmitted through an idle channel, performance of overall write operations may be improved.

Figure 10:
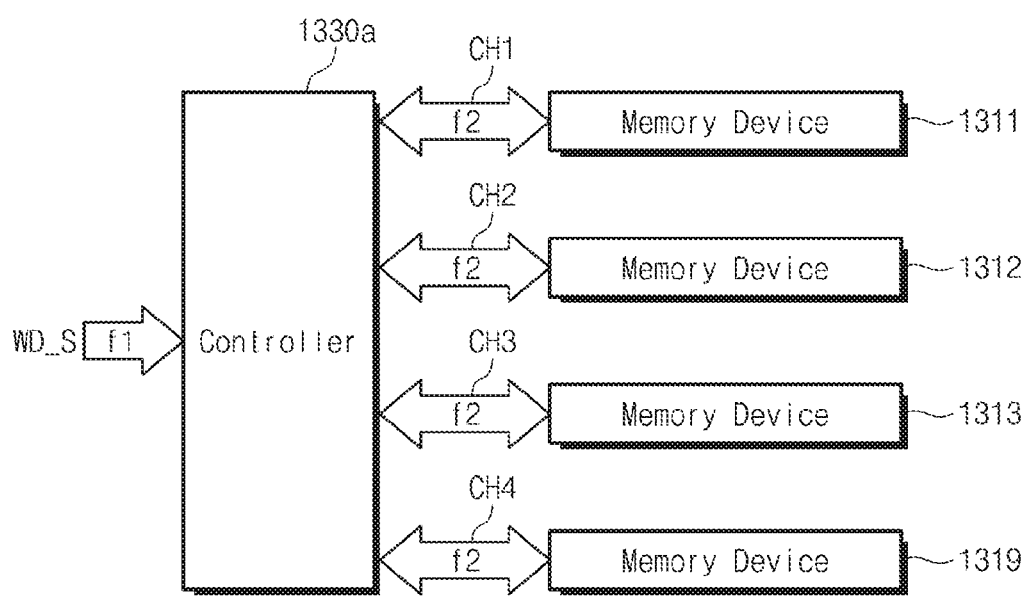
FIG. 10 is a conceptual diagram for describing time divisional multiple transferring with regard to an example write operation of FIGS. 7 and 8.

FIG. 10 is a conceptual diagram for describing time divisional multiple transferring with regard to the example write operation of FIGS. 7 and 8.

For example, receiving write data (e.g., the write data stream WD_S) by the controller 1330a may be synchronized with a clock having a frequency f1. Communication between the controller 1330a and the memory devices 1311, 1312, 1313, and 1319 may be synchronized with a clock having a frequency f2.

Meanwhile, communication between the controller 1330a and the memory devices 1311, 1312, 1313, and 1319 may be performed in the interleaving manner through the channels CH1 to CH4. Accordingly, to improve performance of the interleaving, the frequency f1 may be selected to be higher than the frequency f2.

For example, the frequency f1 may correspond to a product of the frequency f2 and the number of the channels CH1 to CH4. For example, when the frequency f2 is 0.8 gigahertz (GHz), the frequency f1 may be selected as about 3.2 GHz (=0.8×4). In this case, a series of write data included in the write data stream WD_S may be distributed in parallel to the channels CH1 to CH4 (a series of write data being transferred in respective divided time domains), thereby improving performance of the interleaving.

The clocks having the frequencies f1 and f2 may be provided from separate clock generator circuits. In some example embodiments, the clock generator circuits may change the frequencies f1 and f2 based on operations of the controller 1330a and the memory devices 1311, 1312, 1313, and 1319. For example, when some of the channels CH1 to CH4 are idle, the clock generator circuit may decrease the frequency f1 suitably. For example, when an amount of data transferred through the channels CH1 to CH4 increases, the clock generator circuit may increase the frequency f1.

Meanwhile, in some example embodiments, the frequency f1 may be selected to be the same as the frequency f2. In such example embodiments, a data width (e.g., the number of data bits) of the write data stream WD_S may be greater than a data width of data transferred through each of the channels CH1 to CH4. For example, the data width of the write data stream WD_S may correspond to a product of the number of the channels CH1 to CH4 and the data width of data transferred through each of the channels CH1 to CH4.

For example, when data transferred through each of the channels CH1 to CH4 include 8 bits, the data width of the write data stream WD_S may be 32 bits (=8×4). In such example embodiments, a clock for each of the channels CH1 to CH4 may be enabled during a time period inversely proportional to the number of channels when data is transferred through a corresponding channel.

The multi-stream scheme based on stream identifiers associated with different data characteristics has been described with reference to FIGS. 3 to 10. However, the present disclosure is not limited to the above descriptions, and a similar implementation may be employed for a single stream.

For example, the controller 1330a may manage a correspondence relationship between first write data and a physical address indicating a memory region which is determined in advance to store the first write data. The correspondence relationship may be previously managed before the first write data is received.

The first write data may be transferred to the previously determined memory region based on the correspondence relationship, regardless of whether second write data is received. The controller 1330a may control a memory device such that the first write data is stored in the previously determined memory region. The memory region in which the first write data is to be stored may be determined in advance based on various factors such as an operation policy of the host 1100a and the storage device 1300a, user's intention, and/or the like.

III-A. Hardware-Automated Architecture

Figure 11:
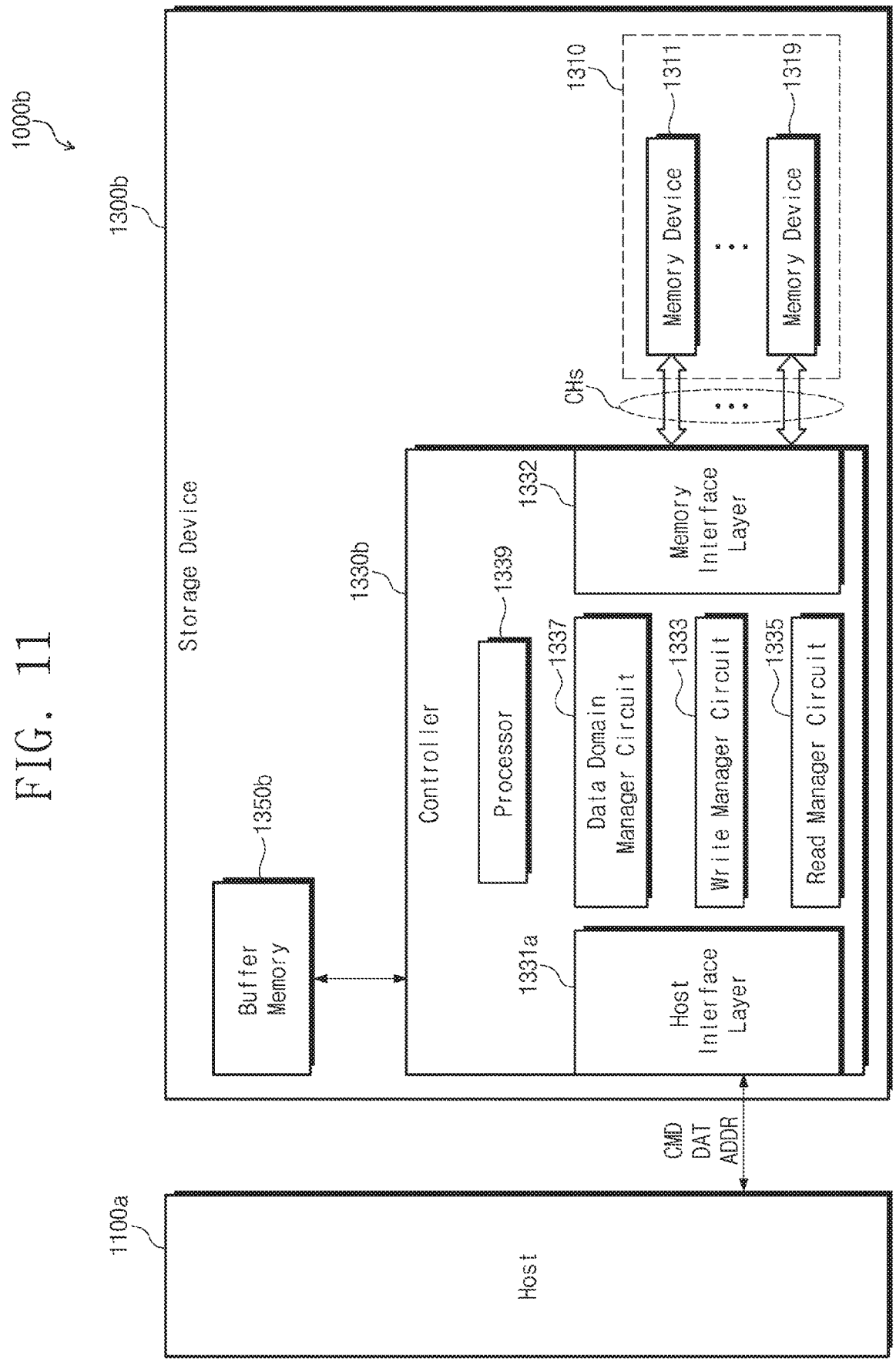
FIG. 11 is a block diagram illustrating an example configuration of a storage device of FIG. 1.

FIG. 11 is a block diagram illustrating an example configuration of the storage device 1300 of FIG. 1. The electronic system 1000 of FIG. 1 may include an electronic system 1000b of FIG. 11. The storage device 1300 of FIG. 1 may include a storage device 1300b of FIG. 11.

Comparing FIG. 11 to FIG. 2, in some example embodiments, the storage device 1300b may include a controller 1330b and a buffer memory 1350b. The controller 1330b may communicate with one or more memory devices 1310 through a plurality of channels CHs. The controller 1330b may include a host interface layer 1331a, a memory interface layer 1332, a write manager circuit 1333, a read manager circuit 1335, a data domain manager circuit 1337, and a processor 1339, which will be described with reference to FIGS. 12 and 19.

The storage device 1300b may be implemented with a "hardware-automated architecture". The storage device 1300b may manage simple jobs by a dedicated hardware circuit, instead of completely depending on control of a processor 1339. The simple jobs which are performed relatively frequently are managed by the dedicated hardware circuit without intervention of the processor 1339, and thus performance and efficiency of the storage device 1300b may be improved.

A buffer memory 1350b may buffer data used in an operation of the storage device 1300b. For example, the buffer memory 1350b may temporarily store data which is referenced by the controller 1330b. However, the buffer memory 1350b may not store write data to be stored in the memory devices 1311 and 1319 or read data output from the memory devices 1311 and 1319, which will be described below. Instead, the buffer memory 1350b may be provided as an auxiliary memory for storing metadata which is to be referenced by the controller 1330b. For example, the buffer memory 1350b may include a volatile memory such as an SRAM, a DRAM, an SDRAM, and/or the like, and/or a nonvolatile memory such as a flash memory, a PRAM, an MRAM, a ReRAM, an FRAM, and/or the like.

Other components which are not described with regard to FIG. 11 may be configured and may operate substantially the same as those described with reference to FIGS. 2 to 10. For brevity, redundant descriptions will be omitted below.

Figure 12:
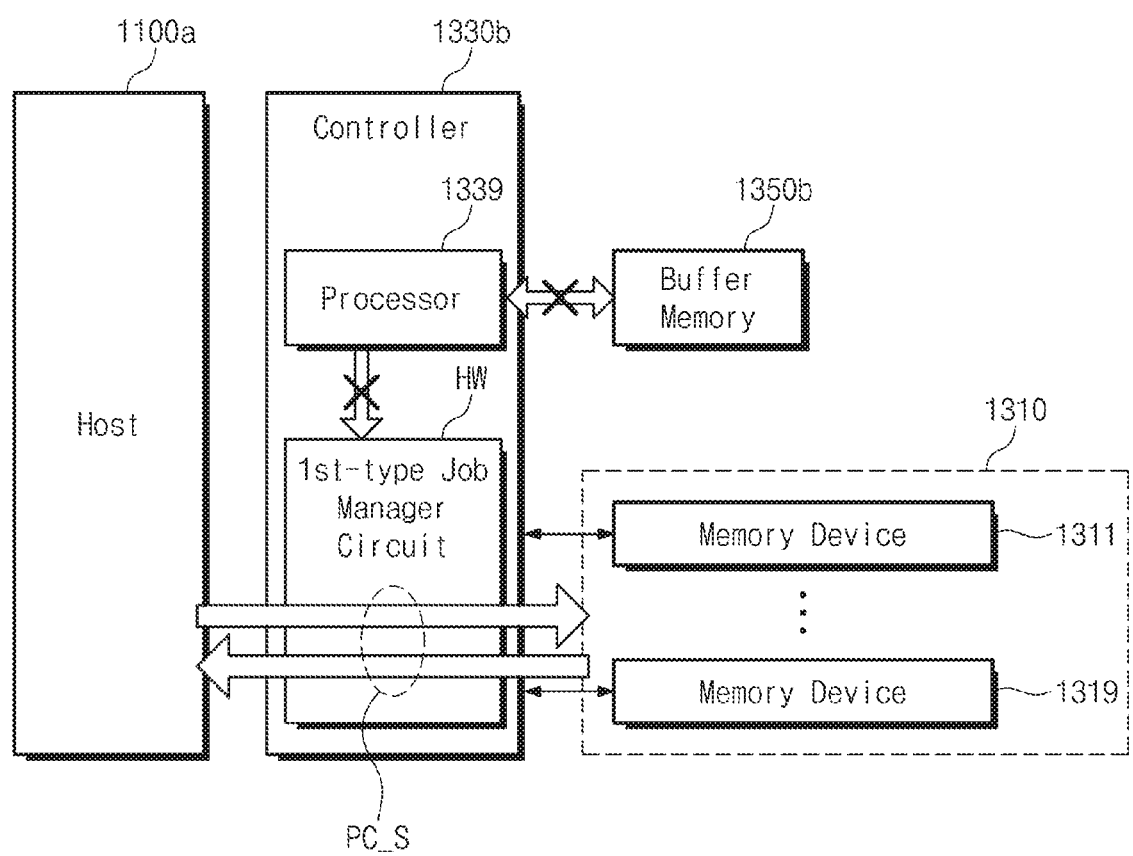
FIGS. 12 and 13 are block diagrams for describing example operations of a storage device of FIG. 11 according to some example embodiments.
Figure 13:
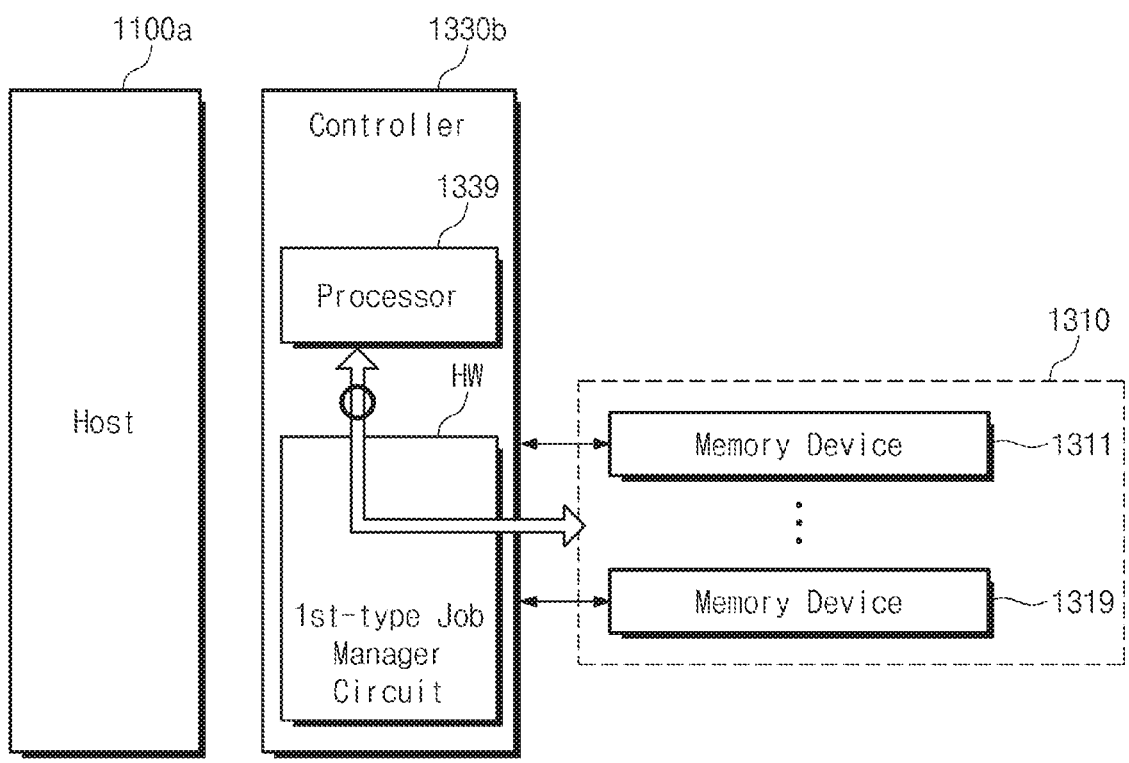

FIGS. 12 and 13 are block diagrams for describing example operations of the storage device 1300b of FIG. 11 according to some example embodiments. Referring to FIGS. 12 and 13, the controller 1330b may include a first-type job manager circuit HW and the processor 1339.

For example, the first-type job manager circuit HW may include the write manager circuit 1333, the read manager circuit 1335, and the data domain manager circuit 1337 of FIG. 11. The first-type job manager circuit HW may manage a first-type of job associated with the memory devices 1311 and 1319. The processor 1339 may process a second-type of job associated with the memory devices 1311 and 1319. For example, the first-type job may include a simple job which is performed more frequently than the second-type job.

For example, the first-type job may include an operation performed on a memory area of a first unit size in the memory devices 1311 and 1319. For example, the first unit size may include a page unit size. For example, the first-type job may include general operations, such as a write operation for storing write data in the memory devices 1311 and

1319, a read operation for outputting read data from the memory devices 1311 and 1319, and/or the like.

For example, the second-type job may include an operation performed on a memory area of a second unit size in the memory devices 1311 and 1319. The second unit size may be different from the first unit size and, for example, may include a block/sub-block/super-block unit size. For example, the second-type job may include management operations such as garbage collection, wear leveling, power failure protection, and/or the like.

Example embodiments based on the above examples will be described in the following descriptions. However, such example embodiments are provided to facilitate better understanding, and are not intended to limit the present disclosure. The first-type job may be variously changed or modified to manage a simple job performed frequently without intervention of the processor 1339. In addition, the second-type job may be variously changed or modified to manage a complex job under control of the processor 1339. The first unit size and the second unit size may also be variously changed or modified, and may be identical to each other.

FIG. 12 illustrates an operation associated with a first-type job. For example, the first-type job may include an operation requested by the host 1100a. The first-type job may be managed according to an operation of a hardware circuit included in the first-type job manager circuit HW, without intervention of the processor 1339.

For example, while the first-type job is managed, intervention of the processor 1339 may be excluded from all operations including allocating a buffer area for data, buffering data, triggering data input/output, controlling a path of the data input/output, and/or the like. While the first-type job is managed normally by the first-type job manager circuit HW, the processor 1339 may not intervene in the first-type job and may not communicate with the buffer memory 1350b.

When the first-type job includes a write operation, the first-type job manager circuit HW may transfer write data received from the host 1100a to one or more memory devices 1310. When the first-type job includes a read operation, the first-type job manager circuit HW may transfer read data output from the one or more memory device 1310 to the host 1100a. The write data and the read data may be transferred in a packet unit of a stream PC_S.

In the meantime, the buffer memory 1350b may not store write data to be stored in the one or more memory device 1310 or read data output from the one or more memory device 1310. Instead, the write data and the read data may be managed in an internal buffer of the first-type job manager circuit HW.

FIG. 13 illustrates an operation associated with a second-type job. For example, the second-type job may include an operation which is performed regardless of a request of the host 1100a. The second-type job may be processed under control of the processor 1339 (e.g., based on a program code of software and/or firmware executed on the processor 1339).

For example, the first-type job manager circuit HW may monitor a status associated with operations of the one or more memory devices 1310 and the controller 1330b. The first-type job manager circuit HW may manage an intervention condition for triggering intervention of the processor 1339, based on the monitored status. For example, the monitored status may be associated with whether an error or exception occurs with regard to the first-type job (e.g., a write operation, a read operation, and/or the like). For example, the intervention condition may be satisfied when an error or exception associated with the first-type job occurs.

When the intervention condition is satisfied while the processor 1339 does not intervene in the first-type job, the first-type job manager circuit HW may provide the processor 1339 with a notification including information of the monitored status. Accordingly, the first-type job manager circuit HW may notify the processor 1339 that the intervention condition is satisfied.

The processor 1339 may output a management command for processing the second-type job, in response to the notification received from the first-type job manager circuit HW. The first-type job manager circuit HW may receive the management command from the processor 1339. The first-type job manager circuit HW may perform the second-type job directed by the management command. The second-type job may include a management operation for resolving the monitored status (e.g., an error or exception associated with the first-type job).

For example, the second-type job may include a management operation directed to the one or more memory devices 1310. The first-type job manager circuit HW may communicate with the one or more memory devices 1310 to perform the second-type job under control of the processor 1339.

III-B. Example Configurations of Controller and Packet

Figure 14:
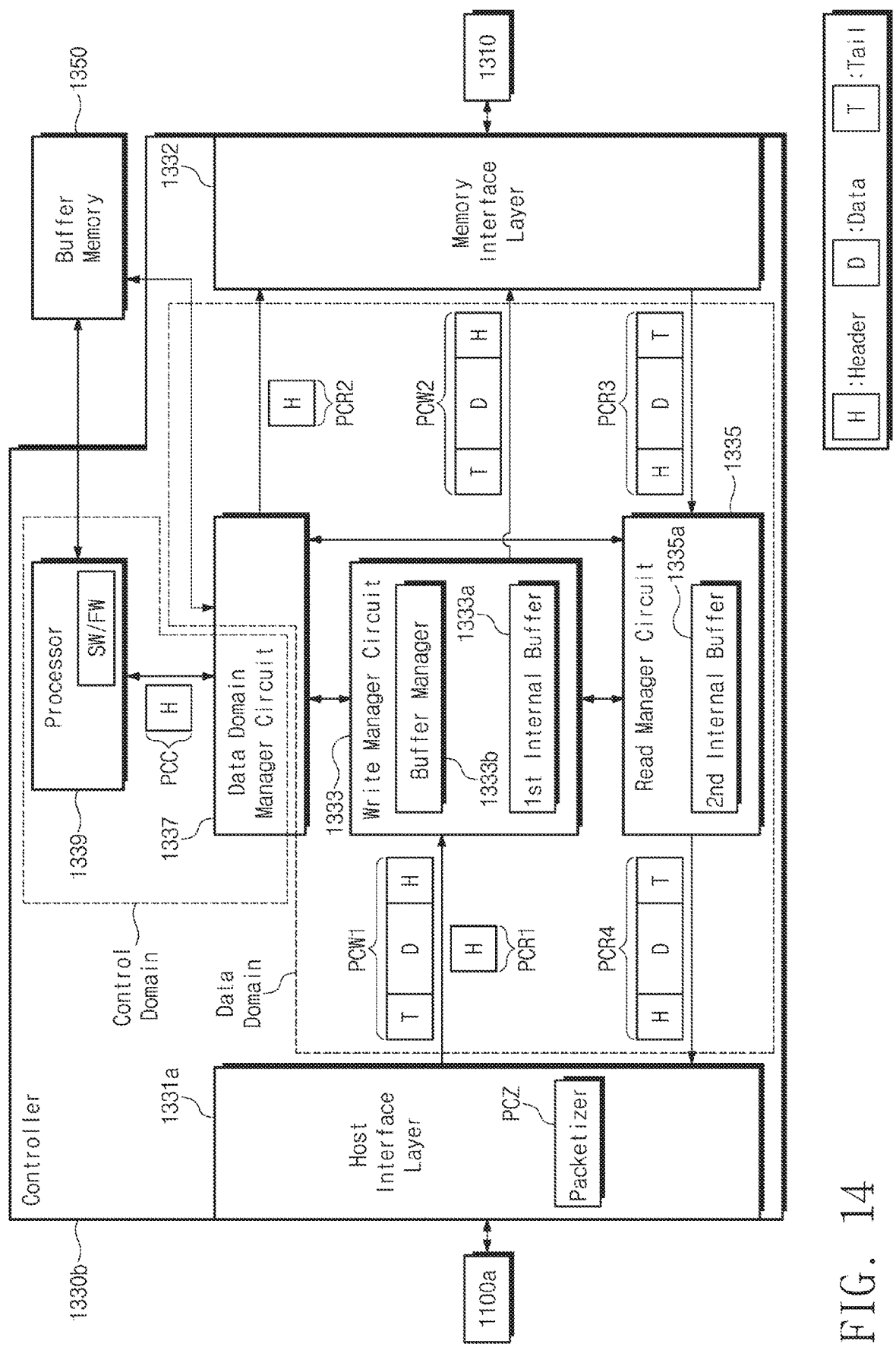
FIG. 14 is a block diagram illustrating an example configuration and an example operation of a controller of FIG. 11 according to some example embodiments.

FIG. 14 is a block diagram illustrating an example configuration and an example operation of the controller 1330b of FIG. 11 according to some example embodiments.

The controller 1330b may include the host interface layer 1331a, the memory interface layer 1332, the write manager circuit 1333, the read manager circuit 1335, the data domain manager circuit 1337, and the processor 1339. For example, the write manager circuit 1333, the read manager circuit 1335, and the data domain manager circuit 1337 may be included in the first-type job manager circuit HW of FIGS. 12 and 13.

The host interface layer 1331a may interface with the host 1100a. For example, the host interface layer 1331a may convert a command and data received from the host 1100a to a format processed in the controller 1330b. For example, the host interface layer 1331a may convert data processed in the controller 1330b to a format handled in the host 1100a, and may output data of the converted format to the host 1100a.

The memory interface layer 1332 may interface with the one or more memory devices 1310. For example, the memory interface layer 1332 may convert write data and a relevant command to a format handled in the one or more memory devices 1310. For example, the memory interface layer 1332 may convert read data received from the one or more memory devices 1310 to a format processed in the controller 1330b.

The write manager circuit 1333 may manage a first-type job. For example, the write manager circuit 1333 may manage a write operation for storing write data in the one or more memory devices 1310. In this example, the write manager circuit 1333 may be on a write path for transferring write data received from the host 1100a to the one or more memory devices 1310.

The read manager circuit 1335 may manage a first-type job. For example, the read manager circuit 1335 may manage a read operation for outputting read data to an outside of the controller 1330b (e.g., to the host 1100a). In this example, the read manager circuit 1335 may be on a read path for transferring read data output from the one or more memory devices 1310 to the outside of the controller 1330*b*.

The data domain manager circuit 1337 may obtain information of a status of at least one of the one or more memory devices 1310, write data, and/or read data, with regard to performing a first-type job. The write manager circuit 1333 and the read manager circuit 1335 may perform a first-type job, and then may provide information of various statuses to the data domain manager circuit 1337. The data domain manager circuit 1337 may monitor a status associated with operations of the one or more memory devices 1310 and the controller 1330*b*, based on the obtained information.

The processor 1339 may include one or more processor cores. The processor 1339 may execute a program code of software SW and/or firmware FW according to an operation of processor core(s). The processor 1330 may execute the program code of software and/or firmware to process the second-type job.

A command and data may be transferred in a packet unit of a stream. To this end, in some example embodiments, the host interface layer 1331*a* may include a packetizer PCZ. The packetizer PCZ may combine a command and data received from the host 1100*a* with additional information (e.g., a destination, an address, a stream identifier, an error check bit, and/or the like, of a packet) to generate a packet PCW1 or a packet PCR1.

When a write command and write data are received from the host 1100*a*, the packetizer PCZ may generate the packet PCW1 including a header portion (H), a data portion (D), and a tail portion (T). For example, the header portion may include information of the write command, and the data portion may include the write data. The tail portion may include information which is suitable to indicate completion of the data portion.

When a read command is received from the host 1100*a*, the packetizer PCZ may generate the packet PCR1 including a header portion (H). The header portion may include information of the read command. Data may not be received with regard to the read operation, and thus in some cases, the packet PCR1 may not include a data portion and a tail portion.

The packetizer PCZ may include a hardware circuit configured to generate the packet PCW1 or the packet PCR1 from a command and data received from the host 1100*a*. An example configuration of a packet processed in the controller 1330*b* will be more fully described with reference to FIG. 15.

The write manager circuit 1333 may include a first internal buffer 1333*a* and a buffer manager 1333*b*. The write manager circuit 1333 may receive the packet PCW1 or the packet PCR1. When the header portion of the packet PCW1 or the packet PCR1 includes information of a command, the write manager circuit 1333 may determine whether the received packet is associated with a write operation or a read operation, with reference to the header portion.

When the write manager circuit 1333 receives the packet PCW1 associated with a write operation, the first internal buffer 1333*a* may buffer a variety of information and write data included in the packet PCW1. For example, the first internal buffer 1333*a* may include a memory device such as an SRAM. The buffer manager 1333*b* may manage allocation of a buffer area of the first internal buffer 1333*a* such that a hazard or collision does not occur when the first internal buffer 1333*a* stores information.

The write manager circuit 1333 may transfer a packet PCW2 to the memory interface layer 1332, based on the write data buffered in the first internal buffer 1333*a*. The memory interface layer 1332 may determine a physical address of a memory area to store the write data, with reference to the header portion (H) of the packet PCW2. The memory interface layer 1332 may transfer the write data to a target memory device which includes the memory area of the determined physical address. Accordingly, the write data may be stored in the one or more memory devices 1310.

When the write operation is performed, the write manager circuit 1333 may map a logical address received from the host 1100*a* to a physical address. The physical address to be mapped may be selected from a list of available physical addresses which are managed by the write manager circuit 1333, the data domain manager circuit 1337, and/or the processor 1339. In some example embodiments, the write manager circuit 1333 may obtain the physical address to be mapped, taking into account a characteristic or a stream identifier of write data. The write data may be stored in a memory area of the mapped physical address in the one or more memory devices 1310.

The write manager circuit 1333 may provide the data domain manager circuit 1337 with information of the received logical address and the mapped physical address. The data domain manager circuit 1337 may manage information of a correspondence relationship between the logical address and the physical address in a buffer memory 1350. The buffer memory 1350 may store the information of the correspondence relationship as first metadata. An example write operation will be further described with reference to FIGS. 16 to 19.

On the other hand, when the write manager circuit 1333 receives the packet PCR1 associated with a read operation, the write manager circuit 1333 may transfer the packet PCR1 to the data domain manager circuit 1337. For example, the write manager circuit 1333 may be configured to route the received packet, based on additional information of the received packet. The write manager circuit 1333 may act as a switch with regard to transferring a command and data.

The data domain manager circuit 1337 may obtain a physical address corresponding to the packet PCR1, with reference to the correspondence relationship of the first metadata stored in the buffer memory 1350. That is, the first metadata may be generated or referenced when the first-type job is managed. The data domain manager circuit 1337 may generate a packet PCR2 including information of the obtained physical address. The data domain manager circuit 1337 may transfer the packet PCR2 to the memory interface layer 1332.

The memory interface layer 1332 may transfer a read command to a target memory device which includes a memory area of the obtained physical address, with reference to a header portion (H) of the packet PCR2. Accordingly, read data may be output from the target memory device. The memory interface layer 1332 may provide a packet PCR3 including the output read data (D) to the read manager circuit 1335.

The read manager circuit 1335 may include a second internal buffer 1335*a*. The second internal buffer 1335*a* may buffer a variety of information included in the packet PCR3. For example, the second internal buffer 1335*a* may include a memory device such as an SRAM. The read manager circuit 1335 may transfer a packet PCR4 to the host interface layer 1331*a*, based on the read data buffered in the second internal buffer 1335*a*.

The host interface layer 1331*a* may transfer the read data (D) included in the packet PCR4 to the host 1100*a*. Accordingly, the read data may be output from the one or more memory devices 1310 to the outside of the controller 1330b.

Each of the write manager circuit 1333, the read manager circuit 1335, and the data domain manager circuit 1337 may include hardware circuit(s) configured to perform operations described above and to be described below. The write manager circuit 1333, the read manager circuit 1335, and the data domain manager circuit 1337 may automatically process a first-type job without intervention of the processor 1339. A command and data may be packetized in a regular format, and thus the hardware circuit(s) of each of the write manager circuit 1333, the read manager circuit 1335, and the data domain manager circuit 1337 may manage a packet unit of a stream based on additional information of a packet even without intervention of the processor 1339.

While the first-type job is managed normally, the processor 1339 may not intervene in the first-type job. In addition, the processor 1339 may not intervene in generating a packet by the packetizer PCZ and transferring a packet unit of a stream along a write path and a read path. In addition, the processor 1339 may not intervene in storing the first metadata in the buffer memory 1350 by the data domain manager circuit 1337 and reading the first metadata from the buffer memory 1350 by the data domain manager circuit 1337.

While the first-type job is managed, the data domain manager circuit 1337 may obtain a variety of information from the write manager circuit 1333 and the read manager circuit 1335. The obtained information may indicate various statuses, including an error or exception, associated with operations of the one or more memory devices 1310 and the controller 1330b. The data domain manager circuit 1337 may manage an intervention condition for triggering intervention of the processor 1339, based on the obtained information.

When an error or exception occurs with regard to a first-type job, failure may occur in operations of the controller 1330b and/or the storage device 1300b. However, a first-type job may include a simple job and may not be suitable to resolving the error or exception. A second-type job may be required to resolve the error or exception, and the processor 1339 may intervene in processing the second-type job.

For example, the intervention condition may be satisfied when an error or exception occurs with regard to a first-type job. The data domain manager circuit 1337 may provide a notification to the processor 1339 to notify the processor 1339 that the intervention condition is satisfied. When a notification is not received, the processor 1339 may not intervene in managing a first-type job, generating and transferring a packet, and managing the first metadata.

On the other hand, when the notification is received, the processor 1339 may provide a management command to the data domain manager circuit 1337 to process a second-type job. The management command may direct a management operation which is performed on at least one of a write path and/or a read path. The notification and the management command may be included in a header portion (H) of a packet PCC.

The processor 1339 may communicate with the buffer memory 1350 to process the second-type job. The buffer memory 1350 may store second metadata. The second metadata may be generated or referenced when the second-type job is managed. That is, the processor 1339 may store the second metadata in the buffer memory 1350 or may read the second metadata stored in the buffer memory 1350, to process the second-type job.

The data domain manager circuit 1337 may perform the second-type job in response to the management command. That is, when an error or exception occurs (e.g., with regard to a first-type job), the processor 1339 may intervene and the second-type job may be performed under control of the processor 1339. When the second-type job accompanies a write operation and/or a read operation, the data domain manager circuit 1337 may provide a suitable command to the write manager circuit 1333 and/or the read manager circuit 1335.

According to the hardware-automated architecture, the controller 1330b may include a data domain associated with a first-type job. In addition, the controller 1330b may include a control domain associated with a second-type job. The write manager circuit 1333 and the read manager circuit 1335 may manage a first-type job in the data domain, and the processor 1339 may process a second-type job in the control domain. The data domain manager circuit 1337 may manage a first-type job in the data domain, and may trigger intervention of the processor 1339 in the control domain.

In the centralized architecture, flow of all data including write data and read data may be concentrated to the buffer memory 1350a, and the processor 1339 may intervene in both a first-type job and a second-type job. In this case, performance of a storage device (e.g., the storage device 1300a) may depend on performance of the processor 1339 and throughput of the buffer memory 1350a. On the other hand, in the hardware-automated architecture, managing a simple job by a separate dedicated hardware circuit without intervention of the processor 1339 may reduce a load of the processor 1339 and the buffer memory 1350b.

As illustrated in FIG. 14, the write path may be physically separated from the read path. Accordingly, a write operation and a read operation may be performed in parallel or simultaneously or concurrently. This may further improve performance for processing a simple job.

In some cases, a first-type job may be managed by a dedicated hardware circuit while the processor 1339 processes a second-type job. That is, the first-type job may be managed simultaneously or concurrently with processing the second-type job, without being interrupted due to the second-type job. The first-type job may be managed by the dedicated hardware circuit without intervention of the processor 1339, thus may be handled in parallel with the second-type job.

As described above, the buffer memory 1350 may store the first metadata and the second metadata. In some example embodiments, the first metadata may be stored separately from the second metadata (e.g., a memory area for storing the first metadata may be different from a memory area for storing the second metadata). In some example embodiments, only the data domain manager circuit 1337 may access both the first metadata and the second metadata, and the processor 1339 may access the second metadata only through the data domain manager circuit 1337. According to such example embodiments, even though the first metadata and the second metadata are respectively and independently managed by the data domain manager circuit 1337 and the processor 1339, coherency and integrity of the first metadata and the second metadata may be secured.

Figure 15:
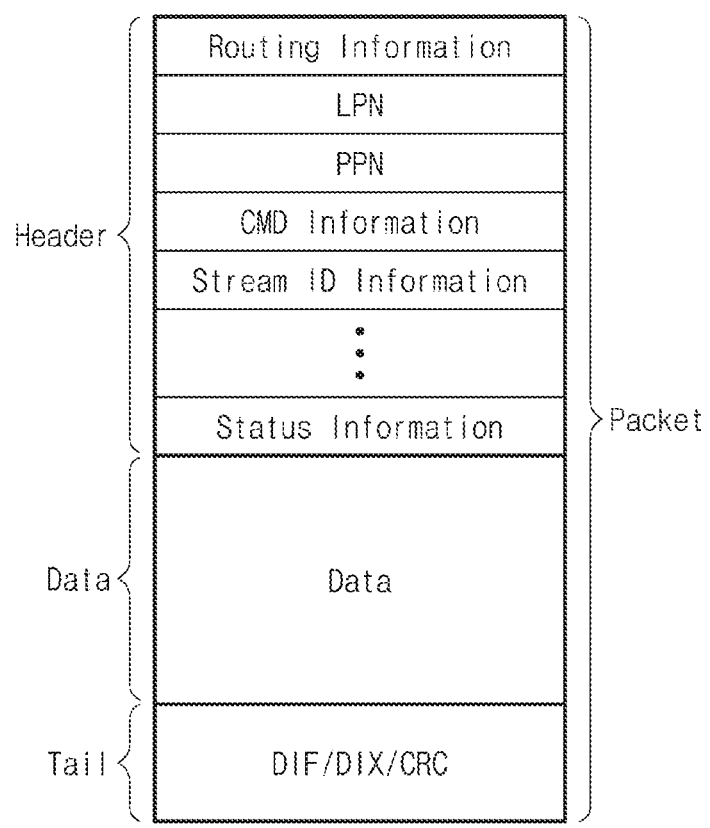
FIG. 15 is a conceptual diagram illustrating an example configuration of a packet of FIG. 14 according to some example embodiments.

FIG. 15 is a conceptual diagram illustrating an example configuration of a packet of FIG. 14 according to some example embodiments.

As described with reference to FIG. 14, one packet may include a header portion, a data portion, and a tail portion. The data portion may include write data or read data.

For example, the header portion may include routing information, information of a logical address LPN, information of a physical address PPN, information of a command CMD, stream identifier information, status information, and/or the like. The routing information may indicate a destination of a packet and may include, for example, a component identifier or marker.

The logical address LPN may include an address received from the host 1100a, and the physical address PPN may include a physical address mapped with the logical address LPN. The command CMD may direct a type of an operation requested by the packet. The stream identifier information may indicate a stream identifier of write data included in the data portion. The status information may indicate a status (e.g., a status associated with an error or exception) associated with operations of the one or more memory devices 1310 and the controller 1330b.

However, the header portion of one packet may not include at least one of information items illustrated in FIG. 15. For example, the information of the physical address PPN may not be included in a packet (e.g., PCW1) which is provided from the host interface layer 1331a to the write manager circuit 1333. For example, the status information may not be included in a packet generated to transfer write data from the host 1100a to the one or more memory devices 1310 or a packet generated to transfer read data from the one or more memory devices 1310 to the host 1100a. A configuration of the header portion may be variously changed or modified depending on a purpose of a packet.

The tail portion may include information which is suitable to indicate completion of the data portion. For example, the tail portion may include integrity/error check information, such as data integrity feature (DIF), data integrity extension (DIX), cyclic redundancy check (CRC), and/or the like. However, the present disclosure is not limited thereto, and the tail portion may be configured to include other information.

One packet may include all of the header portion, the data portion, and the tail portion. Alternatively, one packet may not include at least one of the header portion, the data portion, and/or the tail portion.

For example, a packet generated to transfer write data from the host 1100a to the one or more memory devices 1310 or a packet generated to transfer read data from the one or more memory devices 1310 to the host 1100a may include all of the header portion, the data portion, and the tail portion. For example, a packet generated to transfer a read command from the host 1100a to the one or more memory devices 1310, a notification packet provided from the data domain manager circuit 1337 to the processor 1339, and a management command packet provided from the processor 1339 to the data domain manager circuit 1337 may include only the header portion.

However, the above examples are provided to facilitate better understanding, and are not intended to limit the present disclosure. A packet configuration may be variously changed or modified to automatically manage a first-type job by a separate hardware circuit without intervention of the processor 1339.

III-C. Example Write Operation

Figure 16:
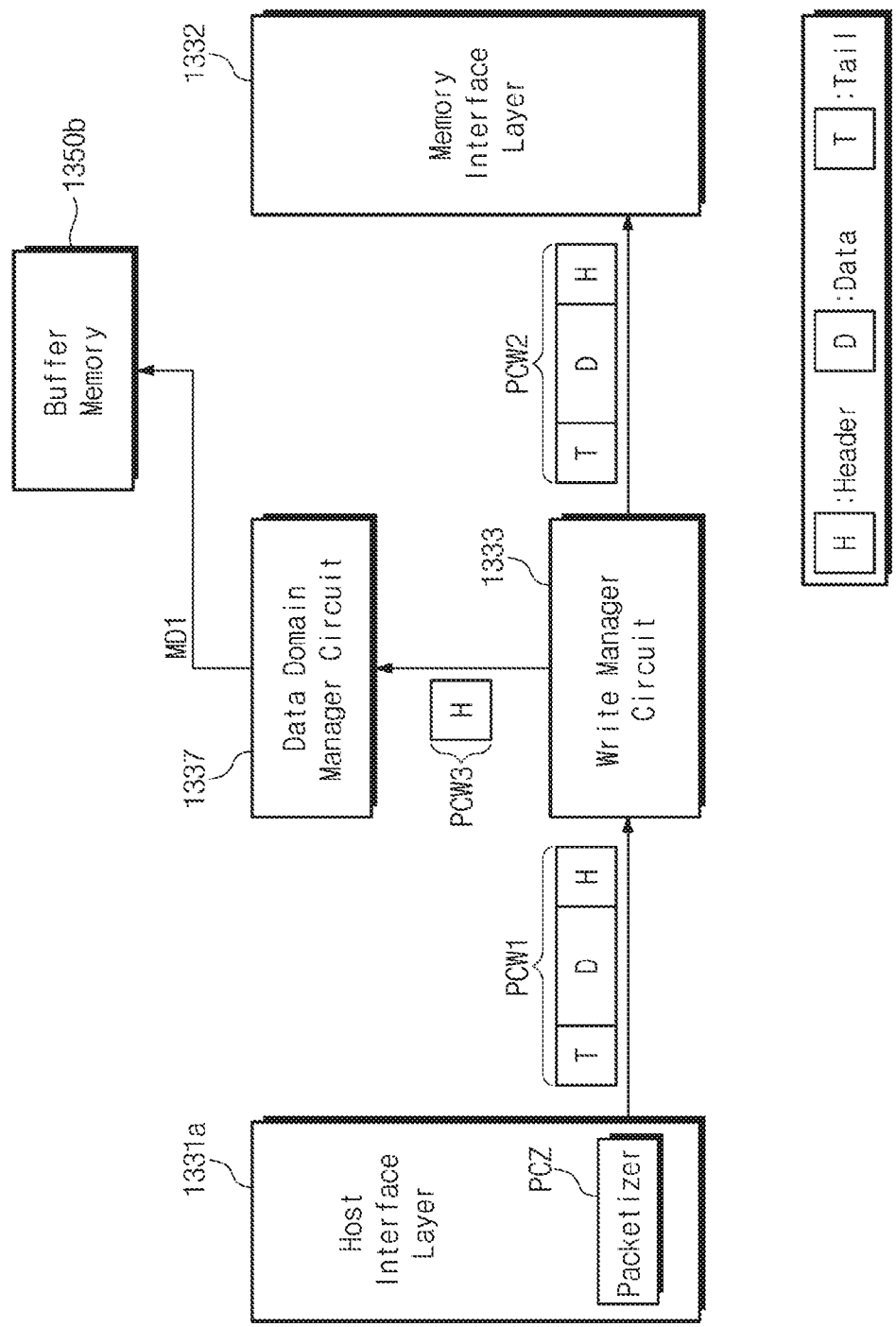
FIGS. 16 to 18 are block diagrams for describing an example write operation performed in a storage device of FIG. 11 according to some example embodiments.
Figure 17:
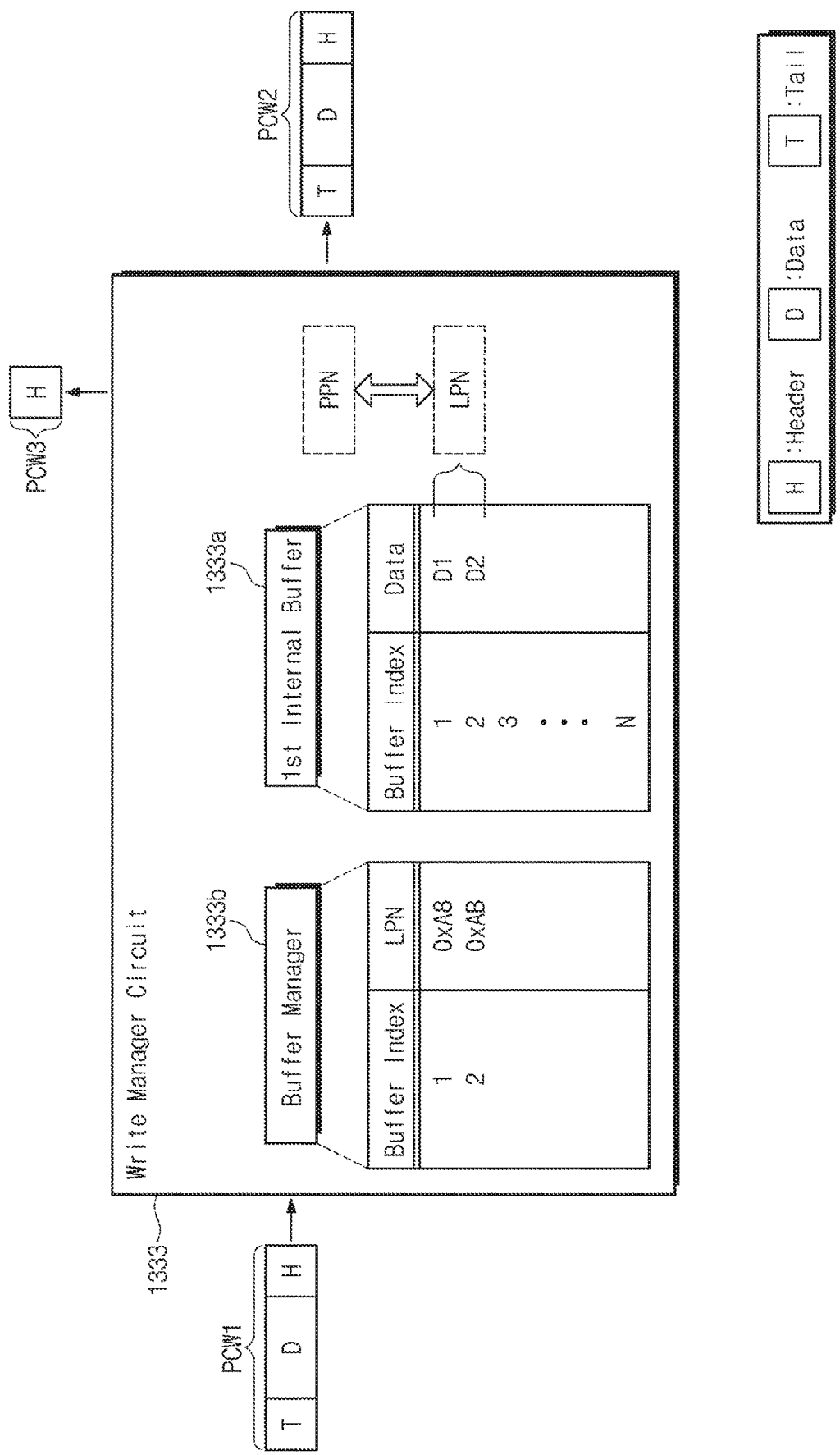
Figure 18:
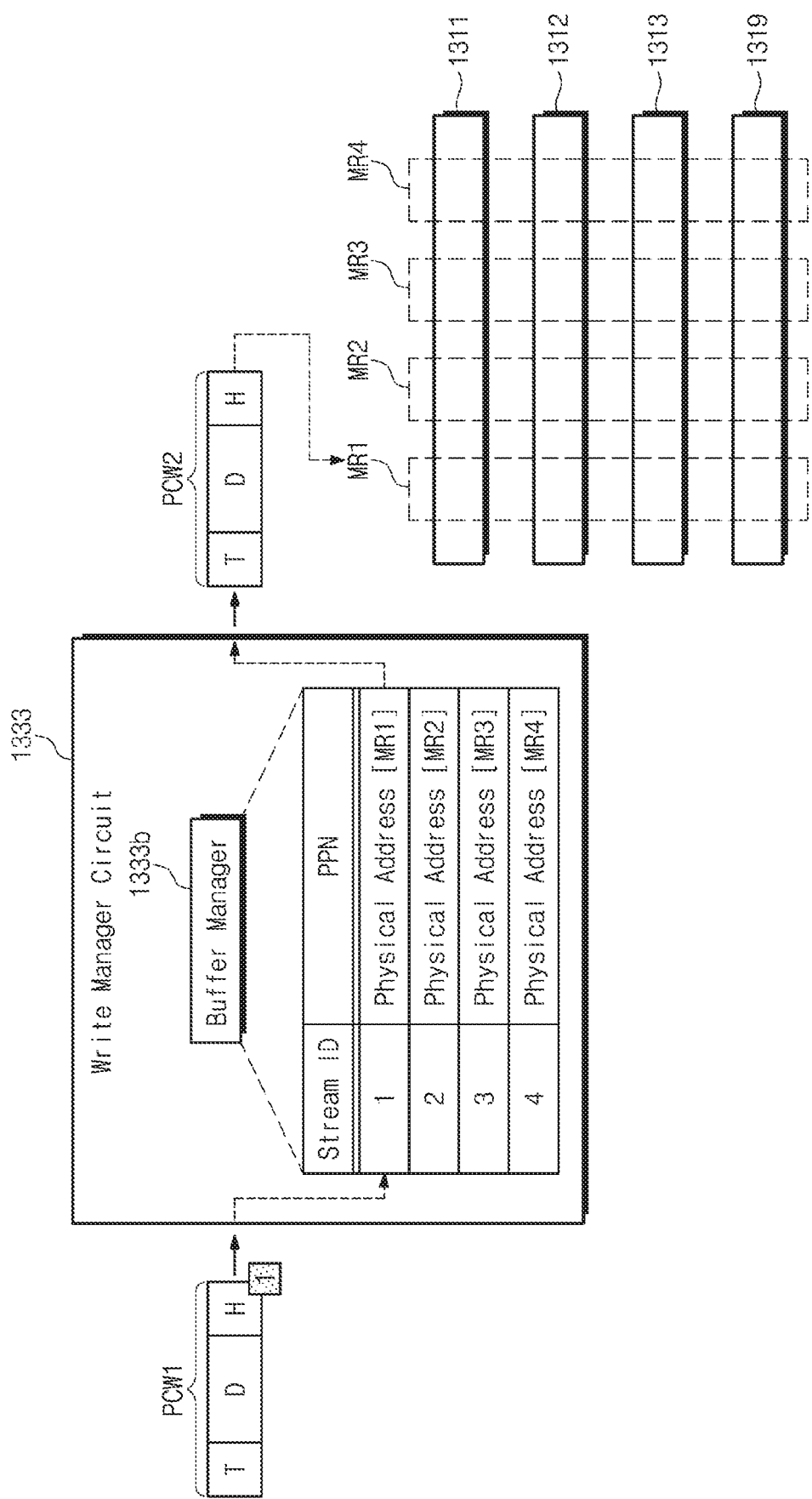
Figure 19:
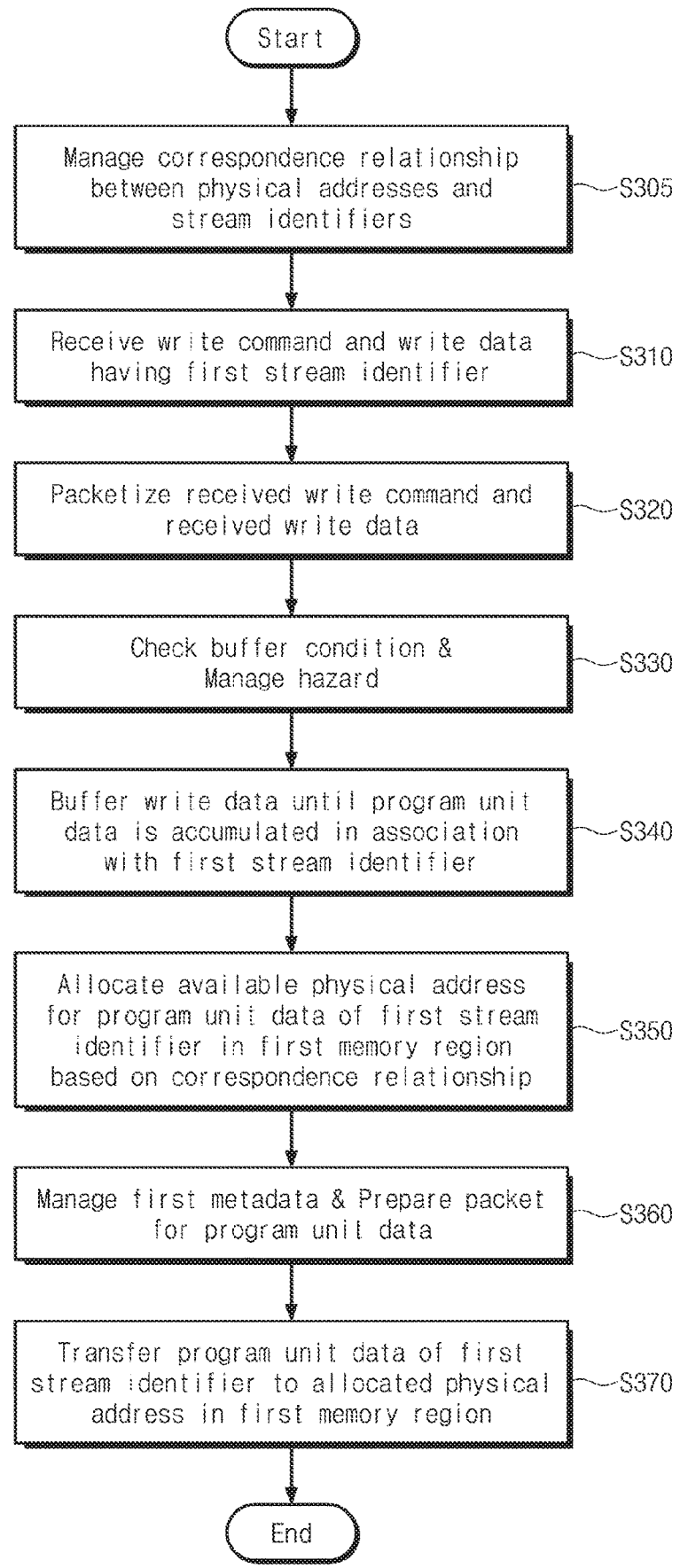
FIG. 19 is a flowchart describing an example write operation performed in a storage device of FIG. 11 according to some example embodiments.

FIGS. 16 to 18 are block diagrams for describing an example write operation performed in the storage device 1300b of FIG. 11 according to some example embodiments. FIG. 19 is a flowchart describing an example write operation performed in the storage device 1300b of FIG. 11 according to some example embodiments. To facilitate better understanding, FIGS. 16 to 19 will be referred to together.

Referring to FIG. 18, the write manager circuit 1333 may manage a correspondence relationship between physical addresses and stream identifiers (operation S305 of FIG. 19). The correspondence relationship may be managed substantially the same as the correspondence relationship CR described with reference to FIGS. 7 and 8. The memory regions MR1 to MR4 may be configured substantially the same as those described with reference to FIGS. 3 to 5.

For example, in the correspondence relationship, a stream identifier of "1" may correspond to a physical address indicating the memory region MR1, and a stream identifier of "2" may correspond to a physical address indicating the memory region MR2. The correspondence relationship may be previously managed before write data is received by the controller 1330b.

Referring to FIG. 16, the host interface layer 1331a may receive a write command and write data from the host 1100a (operation S310 of FIG. 19). The write data may have a specific stream identifier.

The packetizer PCZ may packetize the write command and the write data (operation S320 of FIG. 19). For example, the packetizer PCZ may combine the write command and the write data with additional information to generate the packet PCW1. For example, a header portion (H) of the packet PCW1 may include information of the write command, a logical address, and a stream identifier, and a data portion (D) of the packet PCW1 may include the write data. The packet PCW1 may be provided to the write manager circuit 1333.

In some cases, the header portion of the packet PCW1 may include information such as a type of data, a configuration of data, an exception, and/or the like. The write manager circuit 1333 may determine whether to manage the respective information and how to manage the respective information, based on the information included in the packet PCW1.

Referring to FIG. 17, for example, the buffer manager 1333b may manage a buffer index and a logical address. The buffer index may indicate a location of each buffer area of the first internal buffer 1333a. For example, when write data D1 associated with a logical address of "0xA8" is buffered in a buffer area of a buffer index of "1", the buffer manager 1333b may manage the buffer index and the logical address such that the buffer index of "1" corresponds to the logical address of "0xA8".

For example, the buffer manager 1333b may include a memory device for storing the buffer index and the logical address. Alternatively, the buffer manager 1333b may use a partial memory area of the first internal buffer 1333a to manage the buffer index and the logical address.

The first internal buffer 1333a may buffer write data in a buffer area of each buffer index. FIG. 17 illustrates that only write data is managed in a buffer area of each buffer index. However, in some example embodiments, the first internal buffer 1333a may further manage other information (e.g., a logical address, a command, a stream identifier, and/or the like) associated with respective write data.

When the write manager circuit 1333 receives the packet PCW1, the buffer manager 1333b may check a status of the first internal buffer 1333a in response to the packet PCW1. For example, the buffer manager 1333b may check whether a logical address included in the received packet PCW1 has already been managed. Accordingly, the buffer manager 1333b may manage a hazard or collision with regard to receiving the same address (operation S330 of FIG. 19).

Meanwhile, in some cases, a size of write data received from the host 1100a may be different from a program unit size of program unit data stored by one write operation. In this case, the first internal buffer 1333a may buffer a plurality of pieces of write data until the program unit data is accumulated with regard to a specific stream identifier (operation S340 of FIG. 19).

When the program unit data is accumulated, the write manager circuit 1333 may allocate an available physical address to the program unit data (operation S350 of FIG. 19). Accordingly, a logical address associated with each of pieces of write data of the program unit data may be mapped to a physical address. A physical address to be allocated may be selected from a list of available physical addresses, which are managed by the write manager circuit 1333, the data domain manager circuit 1337, and/or the processor 1339.

However, the physical address to be allocated may be selected based on the stream identifier of the write data and the correspondence relationship. Returning back to FIG. 18, the buffer manager 1333b may manage the correspondence relationship between stream identifiers and physical addresses. The correspondence relationship may be stored in a memory device of the buffer manager 1333b and/or the first internal buffer 1333a.

For example, when program unit data associated with the packet PCW1 has a stream identifier of "1", an available physical address of the memory region MR1 may be allocated for the program unit data based on the correspondence relationship. Accordingly, a header portion (H) of the packet PCW2 may include information of a physical address which indicates a memory area included in the memory region MR1.

Returning back to FIG. 16, the write manager circuit 1333 may provide a packet PCW3 to the data domain manager circuit 1337. A header portion (H) of the packet PCW3 may include information of the logical address associated with a write address and the allocated physical address. Accordingly, the data domain manager circuit 1337 may manage the correspondence relationship between a logical address and a physical address based on the received packet PCW3. The data domain manager circuit 1337 may manage the correspondence relationship in first metadata MD1 (operation S360 of FIG. 19). The buffer memory 1350b may store the first metadata MD1.

The write manager circuit 1333 may prepare the packet PCW2 for the program unit data (operation S360 of FIG. 19). The packet PCW2 may include the program unit data and additional information indicating the allocated physical address. The write manager circuit 1333 may transfer the packet PCW2 to the memory interface layer 1332. Accordingly, the write data and the write command may be transferred in a packet unit of a stream through the write manager circuit 1333 along a write path.

The program unit data and the allocated physical address may be transferred to the one or more memory devices 1310 (operation S370 of FIG. 19). Write data included in the program unit data may be transferred to a memory region indicated by the allocated physical address. Accordingly, the write manager circuit 1333 may manage write operations such that write data is stored in a memory region corresponding to a stream identifier based on the correspondence relationship.

For example, returning back to FIG. 18, write data (or program unit data) having a stream identifier of "1" may be transferred to the memory region MR1 through the write manager circuit 1333 based on the correspondence relationship. Herein, the write data (or the program unit data) having a stream identifier of "1" may be transferred to the memory region MR1, regardless of whether write data having a stream identifier of "2", "3", or "4" is received by the controller 1330b. Accordingly, write data of all stream identifiers may not be fully buffered at the same time, and thus the first internal buffer 1333a may be implemented to have a small capacity.

In some example embodiments, communication between the controller 1330b and the one or more memory devices 1310 through the plurality of channels CHs may employ the interleaving of FIG. 9 and/or the time divisional multiple transferring of FIG. 10. In some example embodiments, implementation similar to the example write operation of FIGS. 16 to 19 may be employed for a single stream. In these example embodiments, performance of a write operation may be further improved.

III-D. Supplements

Figure 20:
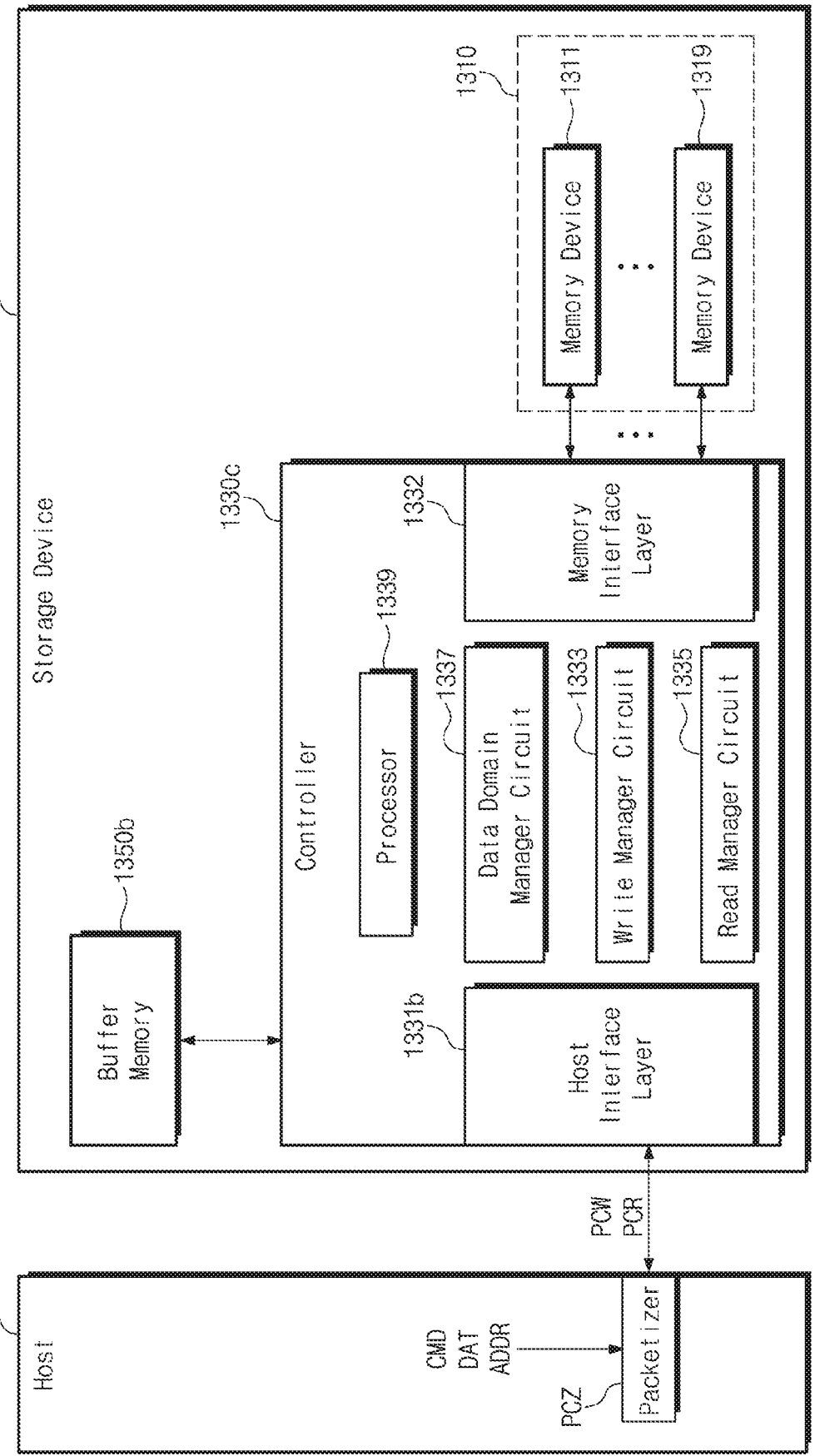
FIG. 20 is a block diagram illustrating an example configuration of a storage device of FIG. 1.

FIG. 20 is a block diagram illustrating an example configuration of the storage device 1300 of FIG. 1. The electronic system 1000 of FIG. 1 may include an electronic system 1000c of FIG. 20. The storage device 1300 of FIG. 1 may include a storage device 1300c of FIG. 20.

Comparing FIG. 20 to FIGS. 11 and 14, in some example embodiments, the packetizer PCZ may be included in a host 1100b, not in a host interface layer 1331b of a controller 1330c. The packetizer PCZ may generate a packet based on a command CMD, data DAT, and an address ADDR generated in the host 1100b. Accordingly, the controller 1330c may exchange a packet PCW or PCR with the host 1100b, and may manage the first-type job based on the packet PCW or PCR.

Other components which are not described with regard to FIG. 20 may be configured and may operate substantially the same as those described with reference to FIGS. 11 to 19. For brevity, redundant descriptions will be omitted.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The scope and spirit of the present disclosure may include implementations which are obtained by simply changing or modifying the above example embodiments, in addition to the above-described example embodiments. Also, the scope and spirit of the present disclosure includes implementations which are accomplished by easily changing or modifying the above-described example embodiments afterwards.

What is claimed is:

1. A storage device comprising:
nonvolatile memories including memory regions; and
a controller configured to:
communicate with the nonvolatile memories through a plurality of channels;
manage a correspondence relationship between physical addresses and stream identifiers, the physical addresses indicating the memory regions, the correspondence relationship being previously managed before first write data is received by the controller; and
control the nonvolatile memories such that the first write data is stored in a first memory region, among the memory regions, of a physical address which is managed corresponding to a first stream identifier of the first write data in the correspondence relationship, wherein:
the first write data is transferred to the nonvolatile memories based on the correspondence relationship, regardless of whether second write data having a second stream identifier is received by the controller,
the controller is further configured to communicate with the nonvolatile memories through a plurality of channels,
a first frequency of a clock for receiving write data by the controller is higher than a second frequency of a clock for communication between the controller and the nonvolatile memories, and
the first frequency corresponds to a product of the second frequency and a number of the plurality of channels.

2. The storage device of claim 1, wherein:
each of the nonvolatile memories includes memory areas, and is connected to one of the plurality of channels, and
each of the memory regions includes at least one memory area which is selected from memory areas connected to a same channel, memory areas included in each of the memory regions being selected in association with all or some of the plurality of channels.

3. The storage device of claim 2, wherein the memory regions respectively include different memory areas which are selected from memory areas connected to the same channel.

4. The storage device of claim 2, wherein each of the memory areas included in the nonvolatile memories corresponds to a block size area on the nonvolatile memories.

5. The storage device of claim 1, wherein the correspondence relationship varies according to operations of the nonvolatile memories.

6. The storage device of claim 1, wherein when a size of the first write data is smaller than a program unit size, the first write data is stored in the first memory region together with one or more pieces of other write data having the first stream identifier.

7. The storage device of claim 1, wherein:
the controller is further configured to control the nonvolatile memories such that the second write data is stored in a second memory region, among the memory regions, of a physical address which is managed corresponding to the second stream identifier in the correspondence relationship, and
memory areas included in the second memory region are different from memory areas included in the first memory region.

8. The storage device of claim 7, wherein the second write data is transferred to the nonvolatile memories based on the correspondence relationship, regardless of whether third write data having a third stream identifier is received by the controller.

9. A storage device comprising:
nonvolatile memories including memory regions;
a buffer memory configured to buffer data; and
a controller configured to communicate with the nonvolatile memories and the buffer memory such that first write data and second write data are stored in the nonvolatile memories, wherein:
the first write data having a first characteristic is stored in a first memory region among the memory regions of the nonvolatile memories, and the second write data having a second characteristic is stored in a second memory region among the memory regions of the nonvolatile memories,
the first write data is transferred to the nonvolatile memories, regardless of whether the second write data is buffered in the buffer memory,
the controller is further configured to communicate with the nonvolatile memories through a plurality of channels,
a first frequency of a clock for receiving write data by the controller is higher than a second frequency of a clock for communication between the controller and the nonvolatile memories, and
the first frequency corresponds to a product of the second frequency and a number of the plurality of channels.

10. The storage device of claim 9, wherein the first memory region is previously determined to store write data having the first characteristic and the second memory region is previously determined to store write data having the second characteristic before the first write data and the second write data are buffered in the buffer memory.

11. The storage device of claim 9, wherein the controller is further configured to previously manage a correspondence relationship, such that a first stream identifier associated with the first characteristic corresponds to a physical address indicating the first memory region and a second stream identifier associated with the second characteristic corresponds to a physical address indicating the second memory region, before the first write data and the second write data are buffered in the buffer memory.

12. The storage device of claim 9, wherein, when a size of the first write data is smaller than a program unit size, the buffer memory is further configured to buffer the first write data together with one or more pieces of other write data having the first characteristic until program unit data of the program unit size is accumulated in association with the first characteristic.

13. The storage device of claim 12, wherein the controller is further configured to communicate with the nonvolatile memories and the buffer memory such that the program unit data which includes the first write data and the one or more pieces of other write data is stored in the first memory region.

14. The storage device of claim 9, wherein:
the controller is further configured to communicate with the nonvolatile memories through a plurality of channels,
each of the nonvolatile memories includes memory areas, and
each of the first memory region and the second memory region includes memory areas which are respectively connected to all or some of the plurality of channels.

15. The storage device of claim 14, wherein the memory areas included in the first memory region are different from the memory areas included in the second memory region.

16. The storage device of claim 14, wherein:
the first write data is stored in a memory area connected to a first channel among the memory areas included in the first memory region, and
when the first channel is not idle, the second write data is stored in a memory area connected to a second channel among the memory areas included in the second memory region.

17. The storage device of claim 14, wherein a plurality of pieces of write data is transferred from the controller to the nonvolatile memories by interleaving through the plurality of channels.

18. The storage device of claim 9, wherein:
the controller is further configured to communicate with the nonvolatile memories through a plurality of channels,
a first data width of write data received by the controller is greater than a second data width of data transferred through each of the plurality of channels, and
the first data width corresponds to a product of the second data width and a number of the plurality of channels.

19. A storage device comprising:
a nonvolatile memory including memory regions; and
a controller configured to control the nonvolatile memory such that first write data is stored in a memory region, among the memory regions, which is previously determined to store the first write data before the first write data is received, wherein:
the first write data is transferred to the nonvolatile memory, regardless of whether second write data is received,
the controller is further configured to communicate with the nonvolatile memories through a plurality of channels,
a first frequency of a clock for receiving write data by the controller is higher than a second frequency of a clock for communication between the controller and the nonvolatile memories, and
the first frequency corresponds to a product of the second frequency and a number of the plurality of channels.

* * * * *